United States Patent
Yanagita et al.

(10) Patent No.: US 7,088,492 B2
(45) Date of Patent: Aug. 8, 2006

(54) MICRO MOVABLE MECHANISM SYSTEM AND CONTROL METHOD FOR THE SAME

(75) Inventors: Yoshiho Yanagita, Tokyo (JP); Shin Yoshizawa, Tokyo (JP)

(73) Assignee: Denso Corporation, Kariya (JP)

( * ) Notice: Subject to any disclaimer, the term of this patent is extended or adjusted under 35 U.S.C. 154(b) by 590 days.

(21) Appl. No.: 10/266,634

(22) Filed: Oct. 9, 2002

(65) Prior Publication Data

US 2003/0094914 A1 May 22, 2003

(30) Foreign Application Priority Data

Oct. 11, 2001 (JP) .............................. 2001-314458

(51) Int. Cl.
G02B 26/08 (2006.01)
G02B 26/00 (2006.01)

(52) U.S. Cl. ...................... 359/290; 359/291; 359/292; 385/18

(58) Field of Classification Search ...................... None
See application file for complete search history.

(56) References Cited

U.S. PATENT DOCUMENTS

| | | | |
|---|---|---|---|
| 4,596,992 A | 6/1986 | Hornbeck | |
| 4,662,746 A | 5/1987 | Hornbeck | |
| 4,710,732 A | 12/1987 | Hornbeck | |
| 4,791,591 A | 12/1988 | Asanuma et al. | |
| 4,956,619 A | 9/1990 | Hornbeck | |
| 5,028,939 A | 7/1991 | Hornbeck et al. | |
| 5,061,049 A | 10/1991 | Hornbeck | |
| 5,096,279 A | 3/1992 | Hornbeck et al. | |
| 5,172,262 A | 12/1992 | Hornbeck | |
| 5,428,259 A | 6/1995 | Suzuki | |
| 5,554,304 A | 9/1996 | Suzuki | |
| 6,262,827 B1 | 7/2001 | Ueda et al. | |
| 6,301,402 B1 | 10/2001 | Bhalla et al. | ................. 385/18 |
| 6,392,220 B1 | 5/2002 | Slater et al. | ................. 250/231 |
| 6,424,757 B1 | 7/2002 | Sparks et al. | ................. 385/18 |
| 6,480,320 B1 * | 11/2002 | Nasiri | .................. 359/291 |
| 6,538,802 B1 * | 3/2003 | Wang et al. | ................ 359/298 |
| 6,633,426 B1 * | 10/2003 | Shrauger et al. | ........... 359/290 |
| 2002/0130561 A1* | 9/2002 | Temesvary et al. | ............ 310/12 |

FOREIGN PATENT DOCUMENTS

EP 0 614 101 A2 2/1994

(Continued)

OTHER PUBLICATIONS

Notice of Rejection/Communication from Japanese Patent Office in Japanese application No. 2002-291713 which is a counterpart Japanese application of U.S. Appl. No. 10/266,634 (English translation attached) mailed on Nov. 1, 2005.

*Primary Examiner*—Thomas H. Tarcza
*Assistant Examiner*—Isam Alsomiri
(74) *Attorney, Agent, or Firm*—Posz Law Group, PLC

(57) ABSTRACT

A micro movable mechanism system includes a micro movable mechanism. A target position generating section generates a signal indicative a target position of the micro movable mechanism. A nonlinear control unit outputs a controller output signal indicating a control value based on a difference between the target position signal and a signal indicating a current position of the micro movable mechanism. A root correction section drives the micro movable mechanism based on a signal proportional to a square root of the control value.

53 Claims, 34 Drawing Sheets

FOREIGN PATENT DOCUMENTS

| | | |
|---|---|---|
| JP | A 6-282305 | 10/1994 |
| JP | A-H08-220454 | 8/1996 |
| JP | A-H09-96768 | 4/1997 |
| JP | B2 2682181 | 8/1997 |
| JP | A-H09-277075 | 10/1997 |
| JP | A 10-23777 | 1/1998 |
| JP | A 11-85285 | 3/1999 |
| JP | 2000-19434 | 1/2000 |
| JP | A-2000-19434 | 1/2000 |
| JP | A 2000-314846 | 11/2000 |
| JP | A 2001-91809 | 4/2001 |
| JP | A-2001-239380 | 9/2001 |

* cited by examiner

MICRO MOVABLE MECHANISM SYSTEM AND CONTROL METHOD FOR THE SAME

BACKGROUND OF THE INVENTION

1. Field of the Invention

The present invention relates to a micro movable mechanism system and a control method for the same. More specifically, the present invention relates to a micro movable mechanism system such as a Micro-Electro-Mechanical System (MEMS) mirror system and a control method for the same.

2. Description of Related Art

Optical communication is carried out by transmitting and receiving light signals through optical transmission lines formed by optical fibers. In the optical communication in practice, the light signals need to be switched between a plurality of optical transmission lines. For this purpose, an optical switch is used to directly switch the light signal to a selected one of the plurality of optical transmission lines.

An optical switch is shown in Japanese Laid Open Patent Application (JP-2000-19434A). The optical switch of the conventional example is composed of an input side optical transmission line and a plurality of output side optical transmission lines. A movable reflection surface reflects the light signal emitted from the input side transmission line to a selected one of the plurality of output side optical transmission lines, which is selected by controlling the reflection surface of the optical switch by a control unit.

A micro machine is shown in Japanese Patent No. 2682181 as an actuator controlling the reflective surface of such an optical switch. In the micro machine, a drive voltage is applied to a fixed electrode to move a movable electrode by electrostatic force. An angle of the moving mobile electrode is determined based on the balance of the electrostatic force and spring stiffness. Therefore, in order to turn the movable electrode to an optional angle, some methods are proposed such as: an open loop control method in which a drive voltage corresponding to a target angle is applied, a feeding-back method in which the warp of the spring is detected and the angle is detected, as shown in U.S. Pat. No. 6,392,220, and a feeding-back control method in which feeding-back control is carried out based on light intensity as shown in U.S. Pat. No. 6,301,402.

The light switch moves the reflection surface in the controllable range of a control unit. With the light switch, it is demanded to expand a controllable angle range of the reflection surface, while keeping a shorter switching time and higher angle precision. Also, it is demanded to increase the number of ports for the light signal to be switched to.

Also, referring to FIG. 26, the relation of the angle of the movable electrode and the electrostatic force generated based on the drive voltage is not linear (a constant ratio). Especially, a difference from the linear relation becomes larger as the angle becomes larger. Consequently, if the movable electrode is moved to a larger angle using a linear control unit for the feedback control, over-shoot occurs in the angle of the movable electrode, as shown in FIG. 27. The over-shoot elongates the switching time. Therefore, it is demanded that the switching time of the light switch can be reduced.

In conjunction with the above description, a controller is disclosed in Japanese Laid Open Patent Application (JP-A-Heisei 6-282305). The controller controls a nonlinear mechanical system which has a plurality of degrees of freedom. The controller is composed of a subtractor which subtracts an output signal of the mechanical system from a preset point signal. A compensation section inputs the output signal of the subtractor as an input signal of a control unit, and compensates a nonlinear operation of the mechanical system. An adder adds an output signal of the compensation section and an output signal of the control unit. Reference models of the control unit and the linearized mechanical system inputs an output signal of the adder as an input signal of the mechanical system. An adaptable section inputs the preset point signal as the input signal of the reference models and adaptively control the compensation section in accordance with the difference between the output signal of the mechanical system and the output signal of the reference models.

Also, a control system of an actuator which has a nonlinear element is disclosed in Japanese Laid Open Patent Application (JP-A-Heisei 10-23777). The control system controls the actuator which has inertia large relatively to a torque constant and in which internal variables such as the torque constant changes in accordance with a turned position. By comparing an drive current value of a motor as a driving source of the actuator and angular acceleration, a deviation quantity of motor drive control from linear control is measured using a relation of current and torque in real time. Thus, external torque observer control is carried out to correct a motor control system. The control system is composed of an oscillation prevention filter for the current drive of the motor, a filter provided in a differentiator attachment and used to calculate angular velocity from a position sensor output to the motor, a filter used to calculate angular acceleration from the angular velocity, a filter provided in a position signal inputting section and used for noise removal, and a noise removal filter which contains a filter after the difference between the current and the angular acceleration is calculated. The noise removal filter has the lowest frequency range.

Also, a servo control method of a nonlinear mechanism is disclosed in Japanese Laid Open Patent Application (JP-A-Heisei 11-85285). In the servo control method, a nonlinear mechanism is controlled in which a ratio of a angular position of a drive motor and a movement quantity of a target to be controlled is controlled. A position instruction is supplied to the servo control unit. A loop gain in a feedback loop of a servo control apparatus is changed in accordance with the rotation angle of the drive motor. Thus, a characteristic can be obtained which is equivalent to the characteristic when a linear mechanism having a constant relation of the rotation angle of the motor and a movement quantity of an object.

Also, a vibration body apparatus is disclosed in Japanese Laid Open Patent Application (JP-P2000-314846A). A space is connected to an external space by providing a penetrating hole for the surface of the substrate opposing to the vibration body to support a mirror. A compressed air generated through the vibration of the vibration body is controlled by providing a mesh electrode and butterfly valve which operate in relation to the operation of the vibration body. The vibration body is prevented from adhering by introducing air into the space through the penetrating hole.

Also, a drive circuit of an electromagnetic drive light scan apparatus is disclosed in Japanese Laid Open Patent Application (JP-P2001-91890A). The drive circuit supplies alternating current for driving a movable board to a coil of the electromagnetic driven light scan apparatus which is composed of a mirror and the coil provided for the surface of the movable board which is turnably supported through a torsion bar, and a magnetic field generating section which generates a magnetic field such that the magnetic field acts on a part of the coil parallel to an axial direction of the torsion bar. The drive circuit is composed of a drive signal generating section for generating a pair of complementary drive signals with a predetermined frequency, a current conversion section for converting DC current into AC current in accordance with the drive signals to supply to the coil, a current detection section for detecting an actual current value which flows through the coil, an angle setting section for setting an angle of the movable board, a current value setting section for setting the drive current value of the movable board such that the angle of the movable board is equal to the set angle, and a current control section for comparing the set current value and the detected current value and for controlling the DC current value supplied to the current conversion section such that the detected current value is equal to the set current value.

Also, a micro movable mechanism is disclosed in Japan Patent No. 2682181. In the micro movable mechanism, a movable electrode is driven in accordance with electrostatic force generated voltage applied to a fixed electrode. One of the movable electrode and the fixed electrode is formed of a single crystal semiconductor which has an uneven shape in a position opposing to the other. The movable electrode or the fixed electrode is formed on a semiconductor substrate, and then the formed electrode is transferred to another substrate.

SUMMARY OF THE INVENTION

Therefore, an object of the present invention is to provide a micro movable mechanism system and a control method for the same, in which a micro movable mechanism can be moved in a shorter time, in a high precision and in a wide controllable range.

Another object of the present invention is to provide a micro movable mechanism system such as a MEMS mirror system and a control method for the same, in which more light signals can be switched.

Another object of the present invention is to provide a micro movable mechanism system such as a MEMS mirror system and a control method for the same, in which the reflection surface of a MEMS mirror can be controlled in a wide range.

An object of the present invention is to provide a micro movable mechanism system such as a MEMS mirror system and a control method for the same, in which a light signal can be switched in higher reliably.

In an aspect of the present invention, a micro movable mechanism system includes a micro movable mechanism. A target position generating section generates a signal indicative a target position of the micro movable mechanism. A nonlinear control unit outputs a controller output signal indicating a control value based on a difference between the target position signal and a signal indicating a current position of the micro movable mechanism. A root correction section drives the micro movable mechanism based on a signal proportional to a square root of the control value.

In another aspect of the present invention, a micro movable mechanism system includes a mirror mechanism which has a mirror surface. A target position generating section generates a signal indicating a target position θr of the mirror surface. A mirror angle deriving section derives a current angle θ of the mirror surface. A nonlinear control unit outputs a controller output signal indicating a control value u based on an angular difference Δθ between the current angle θ of the mirror surface and the target angle θr. A root correction section drives the mirror mechanism based on a signal of a drive voltage V proportional to a square root of the control value u such that the mirror surface is turned.

Here, the micro movable mechanism system may further include a correction value generating section which corrects the control value u. The root correction section drives the mirror mechanism based on the corrected control value such that the mirror surface is turned.

Also, the mirror mechanism may include a movable electrode section and a fixed electrode section. The movable electrode section has the mirror surface and is turned around a rotation axis. A supporting spring section supports the movable electrode section in a predetermined angular position with elastic force. The fixed electrode section is provided apart from the movable electrode section, and the drive voltage signal is applied thereto from the root correction section. The drive voltage corresponds to a value proportional to the square root of the control value u. Thus, the movable electrode section is turned in the electrostatic force generated based on the drive voltage V applied by the fixed electrode section.

In this case, the mirror angle deriving section may measure a direction of a light reflected by the mirror surface to derive the current angle θ. Also, the mirror angle deriving section may include an angle sensor which measures a capacitance between the movable electrode section and the fixed electrode section and derives the current angle θ based on the capacitance.

Also, the mirror angle deriving section may include a nonlinear model section which derives the current angle θ based on a mathematical model and the control value u. In this case, the mathematical model is a motion equation of the movable electrode section.

Also, the mirror angle deriving section may include a nonlinear model section which derives the current angle θ based on a mathematical model and the drive voltage V. In this case, the mathematical model is a motion equation of the movable electrode section.

Also, the mirror angle deriving section may include a nonlinear model section which derives the current angle θ using a mathematical model. In this case, the current angle θ from the predetermined angular position of the movable electrode section is a function in time t. The nonlinear model section may derive the current angle θ from the following equation (1), using a nonlinear gain f(θ) as a function of the current angle θ, constant number J, C, K, and B, and the control value u:

$$J\frac{d^2\theta}{dt^2} + C\frac{d\theta}{dt} + K\theta = Bf(\theta)u \qquad (1)$$

Also, the nonlinear model section may derive the current angle θ from the following equation (2), using a nonlinear gain f(θ) as a function of the current angle θ, constant number J, C, K, and B, the drive voltage V:

$$J\frac{d^2\theta}{dt^2} + Cd\frac{d\theta}{dt} + K\theta = Bf(\theta)V^2 \qquad (2)$$

Also, the mirror angle deriving section may include a nonlinear model section which derives the current angle θ using a mathematical model, and the current angle θ from the predetermined angular position is a function in time t. At this time, the nonlinear model section may derive the current angle θ using a nonlinear gain f(θ) as a function of the current angle θ. In this case, the fixed electrode section is provided apart from a projection line obtained by vertically projecting the rotation axis on a plane where the fixed electrode section exists. The nonlinear gain f(θ) may be expressed by the following equation (3), using a distance D between the movable electrode section and the fixed electrode section, a distance L1 which is the shortest distance from the fixed electrode section to the projection line, a distance L2 (L2>L1>0) which is the longest distance from the fixed electrode section to the projection line, and a length W(x) in a direction parallel to the rotation axis:

$$f(\theta) = \int_{L_1}^{L_2} \frac{W(x)x}{\left\{\left(\frac{D}{\sin|\theta|} - x\right)\theta\right\}^2} dx \quad (3)$$

The constant number B may be expressed by the following equation (4) using a dielectric constant ε between the movable electrode section and the fixed electrode section:

$$B = \frac{1}{2}\varepsilon \quad (4)$$

The constant number J is an inertia moment of the movable electrode section, the constant number C is a dumping of the supporting spring section, the constant number K is a stiffness of the supporting spring section, and the control value u is the following equation:

$$u=V^2.$$

In this case, the fixed electrode section has a rectangle, and is provided apart from a projection line when the rotation axis is vertically projected on a plane where the fixed electrode section exists. The nonlinear gain f(θ) may be expressed by the following equation (5), using a distance D between the rotation axis to the fixed electrode section, a distance L1 from one side of the rectangle which is parallel to the rotation axis to the projection line, a distance L2 (L2>L1>0) from an opposite side to the side to the projection line, and a length W(x) in a direction parallel to the rotation axis:

$$f(\theta)\frac{1}{\theta^2} \quad (5)$$

$$\left[\left(\frac{\frac{D}{\sin|\theta|}}{\frac{D}{\sin|\theta|} - L_2} - \frac{\frac{D}{\sin|\theta|}}{\frac{D}{\sin|\theta|} - L_1}\right) + \left\{\log\left(\frac{D}{\sin|\theta|} - L_2\right) - \log\left(\frac{D}{\sin|\theta|} - L_1\right)\right\}\right]$$

The constant number B may be expressed by the following equation (6), using a length W of a side of the rectangle which is orthogonal to the rotation axis and a dielectric constant ε between the movable electrode section and the fixed electrode section:

$$B = \frac{1}{2}\varepsilon W \quad (6)$$

The constant number J is an inertia moment of the movable electrode section, the constant number C is a dumping of the movable electrode section, the constant number K is a stiffness of the supporting spring section, and the control value u is the following equation:

$$u=V^2.$$

Also, the nonlinear gain f(θ) may be approximated as a polynomial of the current angle θ.

Also, the nonlinear control unit may include a nonlinear state observer section which derives an estimation ωo based on the control value u and the current angle θ, and a linear control unit which derives a new control value u through a linear calculation of the estimation ωo and the current angle θ.

Also, the nonlinear control unit may include a nonlinear state observer section which derives an estimation ωo based on the control value u and the current angle θ, and a linear control unit which derives a new control value u through PID control of the estimation ωo and the angular difference Δθ.

Also, the nonlinear control unit may include a nonlinear state observer section which derives an estimation ωo based on the control value u and the current angle θ such that a new control value u is derived based on the estimation ωo and the angular difference Δθ. In this case, the nonlinear state observer section may include a nonlinear gain section which derives a nonlinear gain f(θ) based on the current angle θ, and a linear state observer section which derives a function of the current angle θ as the estimation ωo based on the following equation (7) using constant numbers J, C, K, and B:

$$J\frac{d^2\theta}{dt^2} + C\frac{d\theta}{dt} + K\theta = Bf(\theta)u \quad (7)$$

In this case, the estimation ωo may be angular speed dθ/dt.

Also, the micro movable mechanism system may further include a calibration section which derives a correction value based on the current angle θ and the control value u. The linear state observer section updates the constant number J, C or K based on the correction value. In this case, the nonlinear operation section may update the constant number L1, the constant number L2, the constant number D or the constant number W based on the correction value. Also, the nonlinear operation section may update the constant numbers of the polynomial approximation based on the correction value.

Also, the micro movable mechanism system may further include a calibration section which derives a correction value based on the current angle θ and the control value u, and a gain correction section which updates the control value u based on the correction value. The root correction section outputs to the mirror mechanism, the drive voltage signal indicating the drive voltage V proportional to a square root of the updated control value u.

Also, the micro movable mechanism system may further include a light intensity sensor which measures a light intensity of a light beam which is reflected by the mirror surface and is received by a light receiving area, and a light intensity angle conversion section which derives the angular difference Δθ based on the light intensity.

In another aspect of the present invention, a micro movable mechanism system includes a mirror mechanism which has a mirror surface rotatable around first and second rotation axes. Each of first and second units drives the mirror mechanism to rotate the mirror surface around a relating one of the first and second rotation axes. Each of the first and second unit includes a target position generating section which generates a signal indicating a target position θr of the mirror surface for the relating rotation axis. A mirror angle deriving section derives a current angle θ of the mirror surface for the relating rotation axis. A nonlinear control unit outputs a controller output signal indicating a control value u for the relating rotation axis based on an angular difference Δθ between the current angle θ of the mirror surface and the target angle θr for the relating rotation axis. A root correction section drives the mirror mechanism for the relating rotation axis based on a signal of a drive voltage V proportional to a square root of the control value u for the relating rotation axis such that the mirror surface is turned.

Here, each of the first and second units further may include a correction value generating section, which corrects the control value u for the relating rotation axis. The root correction section drives the mirror mechanism based on the corrected control value u such that the mirror surface is turned.

Also, the mirror mechanism may include a movable electrode section and a movable frame section. The movable electrode section has the mirror surface and is rotatable around for the first rotation axis. A movable electrode supporting spring section supports the movable electrode section in the predetermined angular position for the first rotation axis with elastic force. The movable frame section is connected to the movable electrode supporting spring section and is rotatable around for the second rotation axis which is not parallel to the first rotation axis. A movable frame supporting spring section supports the movable frame section in a predetermined angular position for the second rotation axis with elastic force. A first fixed electrode section which is arranged in a plane parallel to the first rotation axis. A second fixed electrode section which is arranged in a plane parallel to the second rotation axis. Thus, the movable electrode section and the movable frame section are turned with electrostatic force generated based on the drive voltage signals which are applied to the first and second fixed electrode sections In this case, the mirror angle deriving section may measure a direction of a light reflected by the mirror surface to derive the current angle θ for the relating rotation axis.

Also, the mirror angle deriving section of the first unit may include an angle sensor which measures a capacitance between the movable electrode section and the first fixed electrode section and derives the current angle θ based on the capacitance. The mirror angle deriving section of the second unit may include an angle sensor which measures a capacitance between the movable frame section and the second fixed electrode section and derives the current angle θ based on the capacitance.

Also, the mirror angle deriving section may include a nonlinear model section which derives the current angle θ based on a mathematical model and the control value u. In this case, the mathematical model may be a motion equation of the movable electrode section.

Also, the mirror angle deriving section may include a nonlinear model section which derives the current angle θ based on a mathematical model and the drive voltage V. In this case, the mathematical model may be a motion equation of the movable electrode section.

Also, the mirror angle deriving section may include a nonlinear model section which derives the current angle θ using a mathematical model. In this case, the current angle θ from the predetermined angular position is a function in time t. The nonlinear model section may derive the current angle θ from the following equation (1), using a nonlinear gain f(θ) as a function of the current angle θ, constant number J, C, K, and B, and the control value u:

$$J\frac{d^2\theta}{dt^2} + C\frac{d\theta}{dt} + K\theta = Bf(\theta)u \quad (1)$$

Also, the nonlinear model section may derive the current angle θ from the following equation (2), using a nonlinear gain f(θ) as a function of the current angle θ, constant number J, C, K, and B, the drive voltage V:

$$J\frac{d^2\theta}{dt^2} + Cd\frac{d\theta}{dt} + K\theta = Bf(\theta)V^2 \quad (2)$$

Also, the mirror angle deriving section may include a nonlinear model section which derives the current angle θ using a mathematical model. The current angle θ from the predetermined angular position is a function in time t, and the nonlinear model section derives the current angle θ using a nonlinear gain f(θ) as a function of the current angle θ.

In this case, the fixed electrode section may be provided apart from a projection line obtained by vertically projecting the relating rotation axis on a plane where a corresponding one of the first and second fixed electrode section exists. The nonlinear gain f(θ) may be expressed by the following equation (3), using a distance D between the movable electrode section and the fixed electrode section, a distance L1 which is the shortest distance from the corresponding fixed electrode section to the projection line, a distance L2 (L2>L1>0) which is the longest distance from the corresponding fixed electrode section to the projection line, and a length W(x) in a direction parallel to the relating rotation axis:

$$f(\theta) = \int_{L_1}^{L_2} \frac{W(x)x}{\left\{\left(\frac{D}{\sin|\theta|} - x\right)\theta\right\}^2} dx \quad (3)$$

The constant number B may be expressed by the following equation (4) using a dielectric constant ∈ between a corresponding one of the movable electrode section and the movable frame section and the corresponding fixed electrode section:

$$B = \frac{1}{2}\varepsilon \quad (4)$$

The constant number J is an inertia moment of the movable electrode section, the constant number C is a dumping of the supporting spring section, the constant number K is a stiffness of the supporting spring. section, and the control value u is the following equation:

$$u=V^2.$$

Also, the fixed electrode section has a rectangle, and is provided apart from a projection line when the rotation axis is vertically projected on a plane where the fixed electrode section exists. The nonlinear gain f(θ) may be expressed by the following equation (5), using a distance D between the rotation axis to the fixed electrode section, a distance L1 from one side of the rectangle which is parallel to the rotation axis to the projection line, a distance L2 (L2>L1>0) from an opposite side to the side to the projection line, and a length W(x) in a direction parallel to the rotation axis:

$$f(\theta) = \frac{1}{\theta^2} \left[ \left( \frac{\frac{D}{\sin|\theta|}}{\frac{D}{\sin|\theta|} - L_2} - \frac{\frac{D}{\sin|\theta|}}{\frac{D}{\sin|\theta|} - L_1} \right) + \right.$$

$$\left. \left\{ \log\left(\frac{D}{\sin|\theta|} - L_2\right) - \log\left(\frac{D}{\sin|\theta|} - L_1\right) \right\} \right] \quad (5)$$

The constant number B may be expressed by the following equation (6), using a length W of a side of the rectangle which is orthogonal to the rotation axis and a dielectric constant ∈ between a corresponding one of the movable electrode section and the movable frame section and the corresponding fixed electrode section:

$$B = \frac{1}{2} \varepsilon W \quad (6)$$

The constant number J is an inertia moment of the movable electrode section, the constant number C is a dumping of the movable electrode section, the constant number K is a stiffness of the supporting spring section, and the control value u is the following equation:

$$u = V^2.$$

Also, the nonlinear gain f(θ) is approximated as a polynomial of the current angle θ.

Also, the nonlinear control unit may include a nonlinear state observer section which derives an estimation ωo based on the control value u and the current angle θ; and a linear control unit which derives a new control value u through a linear calculation of the estimation ωo and the current angle θ.

Also, the nonlinear control unit may include:

a nonlinear state observer section which derives an estimation ωo based on the control value u and the current angle θ, and linear control unit which derives a new control value u through PID control of the estimation ωo and the angular difference Δθ.

Also, the nonlinear control unit may include a nonlinear state observer section which derives an estimation ωo based on the control value u and the current angle θ such that a new control value u is derived based on the estimation ωo and the angular difference Δθ. In this case, the nonlinear state observer section may include a nonlinear gain section which derives a nonlinear gain f(θ) based on the current angle θ, and a linear state observer section which derives a function of the current angle θ as the estimation ωo based on the following equation (7) using constant numbers J, C, K, and B:

$$J \frac{d^2\theta}{dt^2} + C \frac{d\theta}{dt} + K\theta = Bf(\theta)u \quad (7)$$

In this case, the estimation ωo may be angular speed dθ/dt.

Also, each of the first and second units further may include a calibration section which derives a correction value based on the current angle θ and the control value u. The linear state observer section may update the constant number J, C or K based on the correction value. Also, the nonlinear operation section may update the constant number L1, the constant number L2, the constant number D or the constant number W based on the correction value. Also, the nonlinear operation section may update the constant numbers of the polynomial approximation based on the correction value.

Also, each of the first and second units further may include a calibration section which derives a correction value based on the current angle θ and the control value u, and a gain correction section which updates the control value u based on the correction value. The root correction section outputs to the mirror mechanism, the drive voltage signal indicating the drive voltage V proportional to a square root of the updated control value u.

Also, each of the first and second units further may include a light intensity sensor which measures a light intensity of a light beam which is reflected by the mirror surface and is received by a light receiving area, and a light intensity angle conversion section which derives the angular difference Δθ based on the light intensity.

In another aspect of the present invention, a control method of a micro movable mechanism section, may be achieved by (a) carrying a coarse control operation to control a current angle θ of a micro movable mechanism section based on an angular difference Δθ between the current angle and a target angle of a mirror surface of the micro movable mechanism; and by (b) When the current angle θ converges through a coarse control operation and the light receiving area receives a beam spot of the reflected light from the mirror surface, carrying out a fine control operation to control the current angle θ based on the angular difference Δθ.

Here, the control method may further include the step of: (c) determining whether the light receiving area receives the light spot, from a threshold value and the light intensity difference ΔP between the light intensity p of the light spot which is equivalent to the angular difference Δθ and a target light intensity pref.

Also, the control method may further include the step of: (d) searching the light receiving area when the current angle θ converges through the coarse control operation and the light receiving area does not receive the beam spot. In this case, the (d) searching step may be achieved by moving the beam spot to a direction which the beam spot is moved in the coarse control operation. Also, the movable electrode section of the micro movable mechanism section may be rotatable around 2 un-parallel axes. At this time, the moving step includes moving the beam spot by rotating the movable electrode section around one of the 2 axes.

Also, a control period after the convergence of the angular difference Δθ is longer than a control period before the convergence of the angular difference Δθ.

BRIEF DESCRIPTION OF THE DRAWINGS

The above and other objects, features and advantages of the present invention will become more apparent from the following detailed description when taken in conjunction with the accompanying drawings wherein.

DESCRIPTION OF THE PREFERRED EMBODIMENTS

Hereinafter, a micro movable mechanism system such as a MEMS mirror system according to the present invention will be described in detail with reference to the attached drawings.

Figure 1:
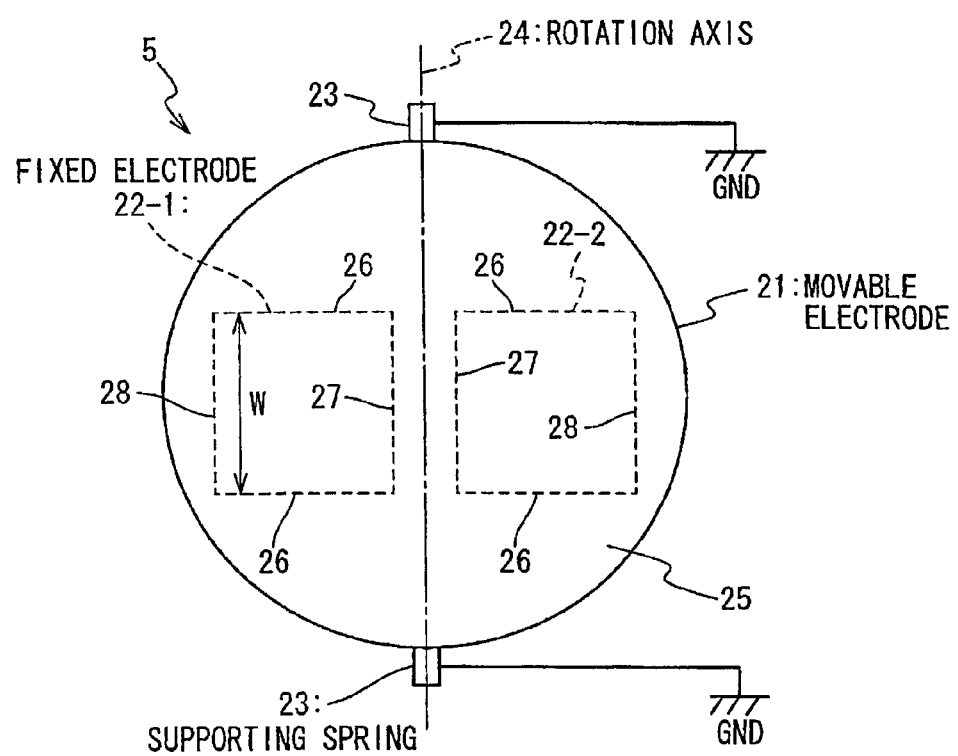
FIG. 1 is a plan view of a mirror mechanism as a control target of the MEMS mirror system.

FIG. 1 is a plan view of a mirror mechanism 5 as a control target of the MEMS mirror system. As shown in FIG. 1, the mirror mechanism 5 is composed of a section of a movable electrode 21, a fixed electrode section of fixed electrodes 22-1 and 22-2 and a supporting spring 23. The movable electrode section 21 is formed in the shape of a flat plate and has a flat mirror surface 25 reflecting a laser beam. The supporting spring 23 is formed of a resilient or elastic body and supports the movable electrode section 21 at two points. That is, the supporting spring 23 supports the movable electrode section 21 rotatably around a rotation axis 24, and gives resilient force to the movable electrode section 21 such that the movable electrode section 21 can move back to a predetermined angular position. The movable electrode section 21 is grounded to a ground potential GND via the supporting spring 23.

Each of the fixed electrodes 22-1 and 22-2 is formed in the shape of a flat rectangular plate. The rectangular plate has sides 26 perpendicular to the rotation axis 23, and sides 27 and 28 with the width W in a direction parallel to the rotation axis 24. The side 27 is closer to the rotation axis 24 than the side 28.

Figure 2:
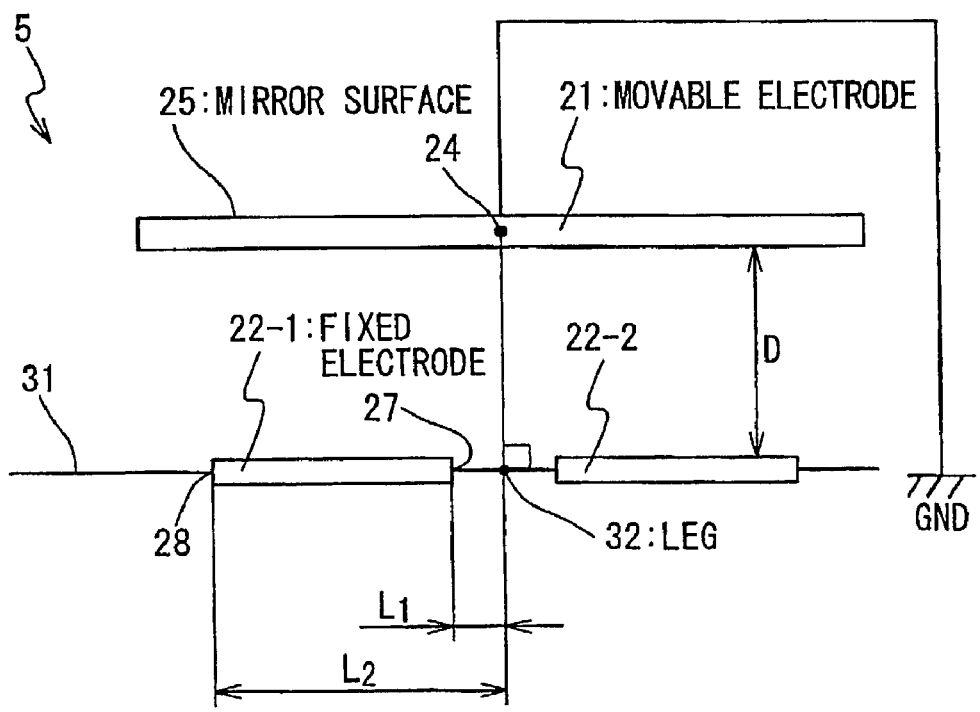
FIG. 2 is a cross sectional view showing the mirror mechanism.

As shown in FIG. 2, each of the fixed electrodes 22-1 and 22-2 is arranged on a plane 31 in parallel to the movable electrode section 21 in a predetermined plane orientation. The fixed electrodes 22-1 and 22-2 are spaced from each other by a gap on the plane 31, and a line 32 perpendicular to the plane 31 and passing through the rotation axis 24 is present in the gap. The side 27 is arranged away from the line 32 by a length L1 (L1>0), and the side 28 is arranged away from the line 32 by a length L2 (L2>0). The length L2 is longer than the length L (L1<L2). The fixed electrodes 22-1 and 22-2 are apart from the movable electrode section 21 in a vertical direction by a distance D. Any one of the fixed electrodes 22-1 and 22-2 is applied a drive voltage. The potential of one of the fixed electrodes 22-1 and 22-2 is equal to the ground potential GND.

Figure 3:
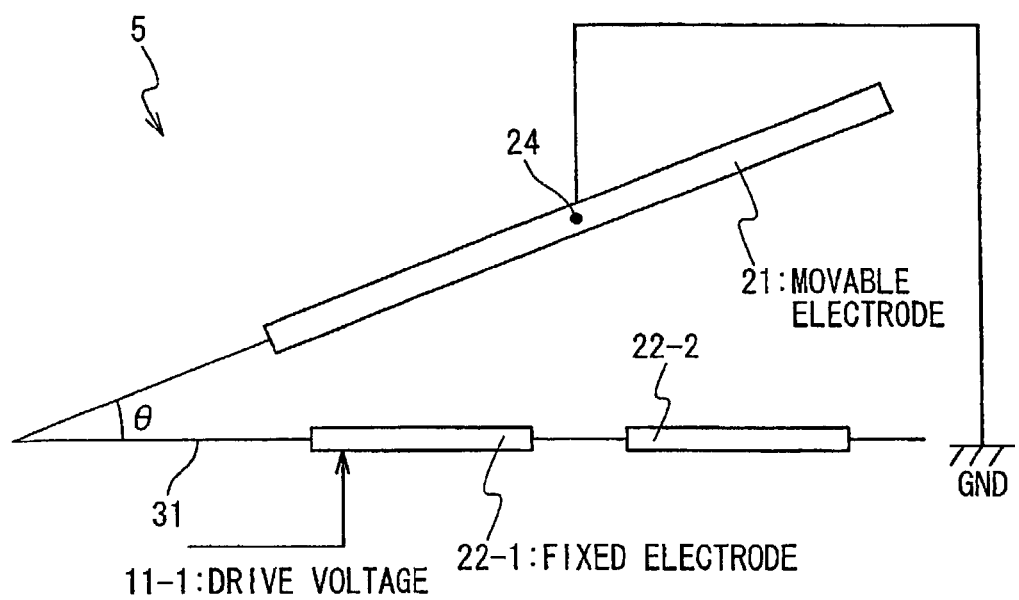
FIG. 3 is a cross-sectional view showing the mirror mechanism driven based on a drive voltage.

When the drive voltage 11 is applied to the fixed electrode 22-1, the movable electrode section 21 is turned around the axis 24 by an angle θ with electrostatic force, as shown in FIG. 3. The angle θ is an angle between the normal of the turned mirror surface 25 and the normal of the mirror surface 25 in a predetermined plane orientation. When the drive voltage 11 is applied to the fixed electrode 22-2, the movable electrode section 21 is turned around the rotation axis 24 in the opposite direction of the angle θ.

An angular motion equation of the movable electrode section 21 is expressed by the following equation (1):

$$J\frac{d^2\theta}{dt^2} + C\frac{d\theta}{dt} + K\theta = T_q \qquad (1)$$

where J is inertial moment of the movable electrode section 21, C is a damping of the supporting spring 23, K is a stiffness of the supporting spring 23, and Tq is a torque acting on the movable electrode section 21 by the drive voltage 11 applied to the fixed electrode 22-1 or the fixed electrode 22-2.

When the angle θ is sufficiently small, the torque Tq is expressed by the following equation (2):

$$T_q = \frac{1}{2}\varepsilon W \int_{L_1}^{L_2} \frac{x}{\left\{\left(\frac{D}{\sin|\theta|} - x\right)\theta\right\}^2} dx V^2 \qquad (2)$$

where ε is a dielectric constant of a space between the movable electrode section 21 and the fixed electrode 22-1, and V is a drive voltage V applied to the fixed electrode 22-1.

The torque Tq is obtained by surface integrating a torque generated in the movable electrode section 21 when the drive voltage V is applied to a small region ds on the fixed electrode 22-1 or 22-2. It should be noted when the drive voltage V is applied to the fixed electrode 22-2, the torque T has an opposite sign to the sign when the drive voltage V is applied to the fixed electrode 22-1. The torque Tq is expressed by the following equation (3):

$$T_q = Bf(\theta)u \qquad (3)$$

where B is a constant independent from an angle θ, f(θ) is a nonlinear gain as a function of the angle θ as shown in FIG.

4, and u is a control value as a function of the drive voltage v. Also, the constant B is expressed by the following equation (4):

$$B = \frac{1}{2}\varepsilon W \qquad (4)$$

Also, the control value u can be expressed by the following equation (5):

$$u = V^2 \qquad (5)$$

Also, the nonlinear gain f (e) can be expressed by the following equation (6):

$$f(\theta) = \frac{1}{\theta^2}\left[\left(\frac{\frac{D}{\sin|\theta|}}{\frac{D}{\sin|\theta|} - L_2} - \frac{\frac{D}{\sin|\theta|}}{\frac{D}{\sin|\theta|} - L_1}\right) + \left\{\log\left(\frac{D}{\sin|\theta|} - L_2\right) - \log\left(\frac{D}{\sin|\theta|} - L_1\right)\right\}\right] \qquad (6)$$

A trigonometric function and a logarithm function are contained in the non-linear gain f(θ) and the calculation load is high. In order to reduce the calculation load, it is effective to approximate the nonlinear gain f(θ) by a polynomial of the angle θ by carrying out Taylor development of the nonlinear gain f(θ) with respect to the angle θ, and by taking up terms up to a finite order, because the angle θ is small sufficiently in the MEMS mirror. When the nonlinear gain f(θ) is expressed by the equation (6), an approximated non-linear gain fa(θ) when the nonlinear gain f(θ) is subjected to the Taylor development can be expressed by the following equation (7):

$$f_a(\theta) = \sum_{n=2}^{\infty}\left(1 - \frac{1}{n}\right)(L_2^n - L_1^n)\frac{\theta^{n-2}}{D^n}\left\{\sum_{k=0}^{\infty}\frac{(-1)^k \theta^{2k}}{(2k+1)!}\right\}^n \qquad (7)$$

Figure 33:
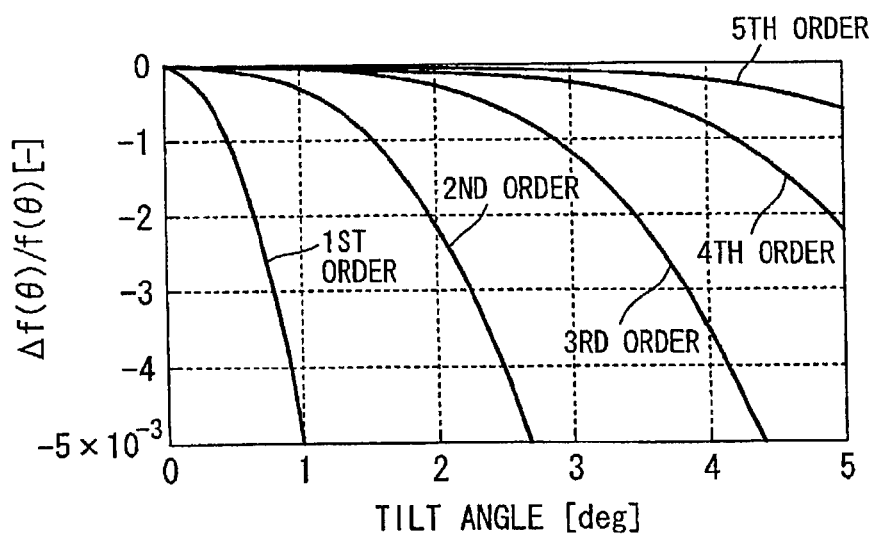
FIG. 33 is a graph showing an approximate error $\Delta f(\theta)$ $(=fa(\theta)-f(\theta))$ of a non-linear gain.

The precision required can be attained by increasing a maximum order of angle θ. For example, when L1=150 μm, L2=300 μm and D=100 μm, an approximate error Δf(θ) (=fa(θ)−f(θ)) of the non-linear gain becomes small by increasing the maximum order of angle θ, as shown in FIG. 33.

The torque Tq may be determined by an experiment or a numerical calculation. In this case, the approximate error Δf(θ) may be determined by plotting the curve of the polynomial of the angle θ on the curve of the nonlinear gain f(θ) which was found from the torque. This method is effective when the torque Tq is analytically determined.

Figure 35:
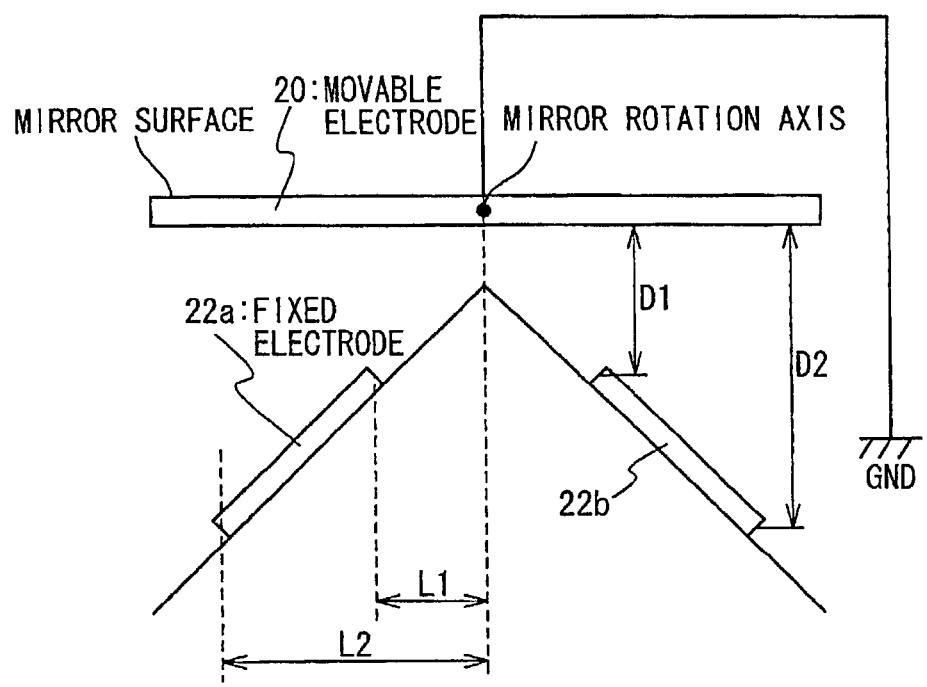
FIG. 35 is a cross sectional view of the mirror mechanism according to a first modification of the first embodiment.
Figure 36:
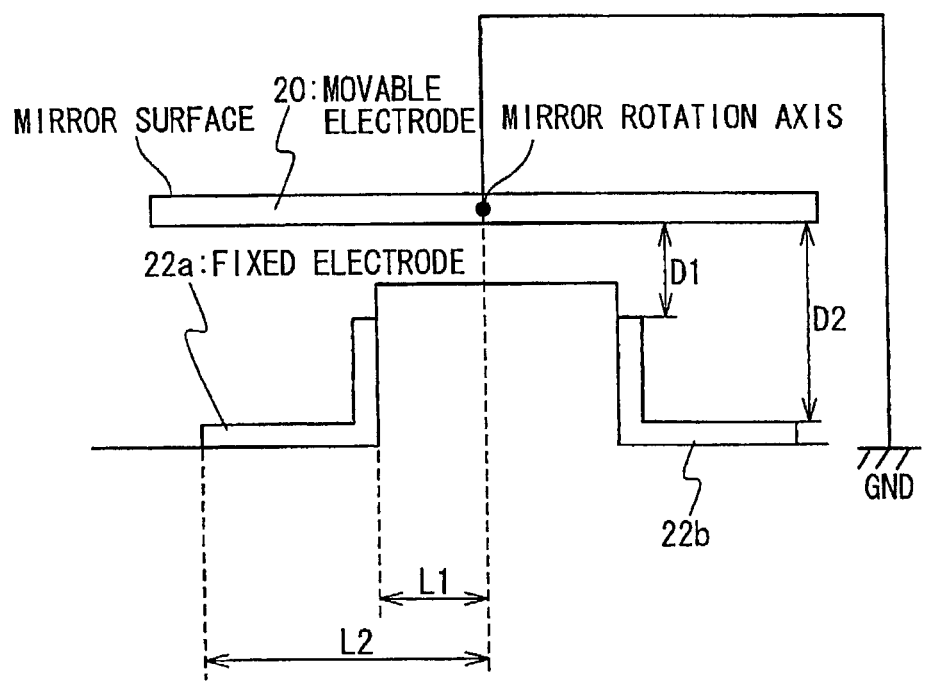
FIG. 36 is a cross sectional view of the mirror mechanism according to a second modification of the first embodiment.
Figure 37:
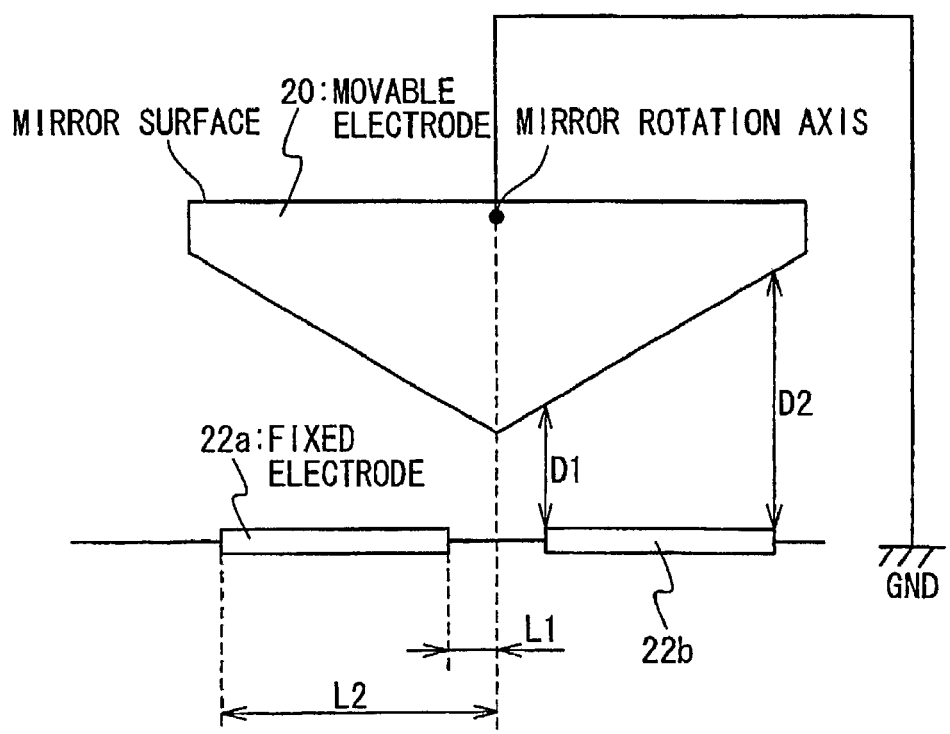
FIG. 37 is a cross sectional view of the mirror mechanism according to a third modification of the first embodiment.
Figure 38:
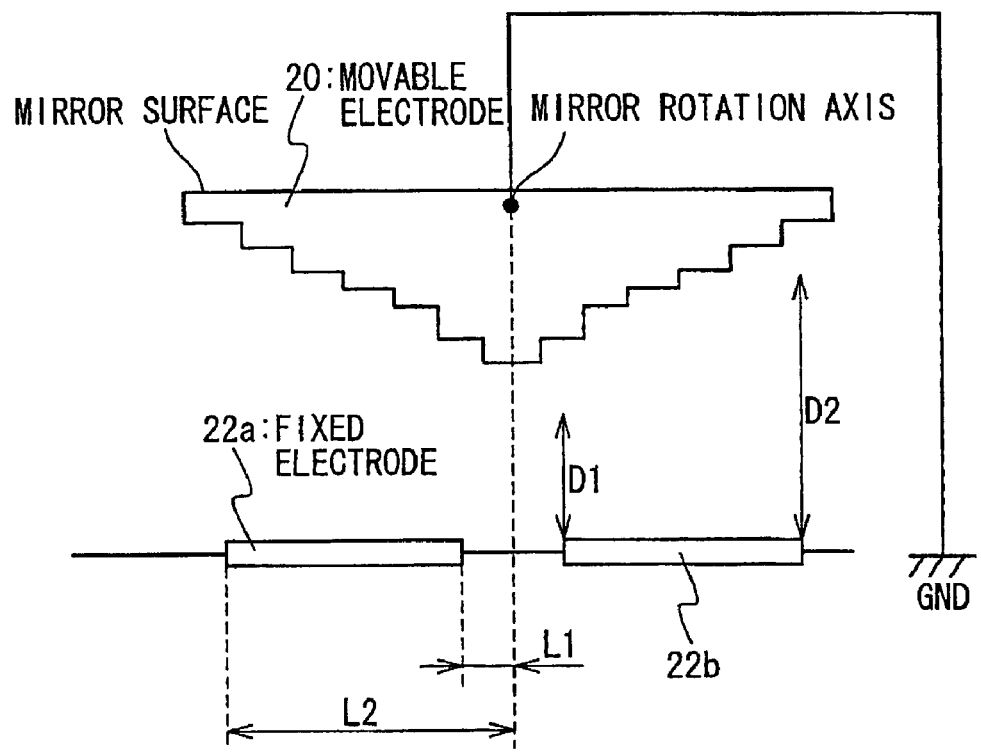
FIG. 38 is a cross sectional view of the mirror mechanism according to a fourth modification of the first embodiment.

Even if at least one of the movable electrode and each of the fixed electrodes is not pianer, the above description can be applied by determining the torque Tq through analysis, experiment, or numerical calculation. For example, it is effective even when the fixed electrode is formed on a cone (FIG. 35) or as an L-like step shape (FIG. 36), or the movable electrode is formed to have the shape of a cone (FIG. 37) or a L-like step shape (FIG. 38), or a combination of them.

Figure 4:
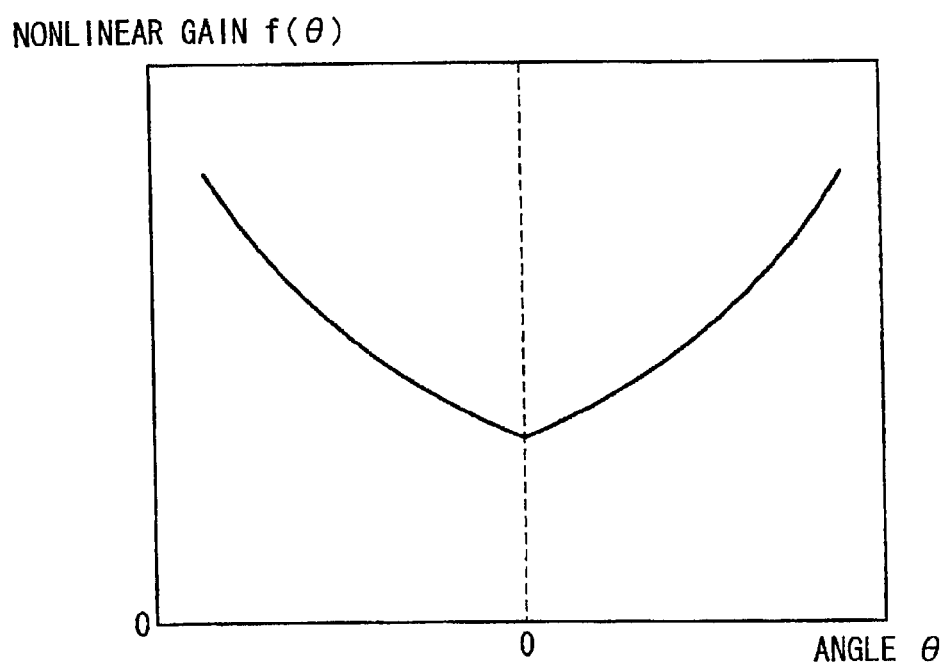
FIG. 4 is a graph showing the characteristic of a nonlinear gain $f(\theta)$.

The nonlinear gain f(θ) depends on the parameters L1 and L2 of the electrode shape. That is, the function f(θ) is uniquely determined for each electrode. Especially, when the electrode is symmetrical with respect to an axis when the rotation axis of the mirror is projected on the plane 31 in FIG. 2, the nonlinear gain f(θ) is an even function of the angle θ, as shown in a graph of FIG. 4, and the following equation (8) is satisfied:

$$f(-\theta)=f(\theta) \tag{8}$$

Figure 5:
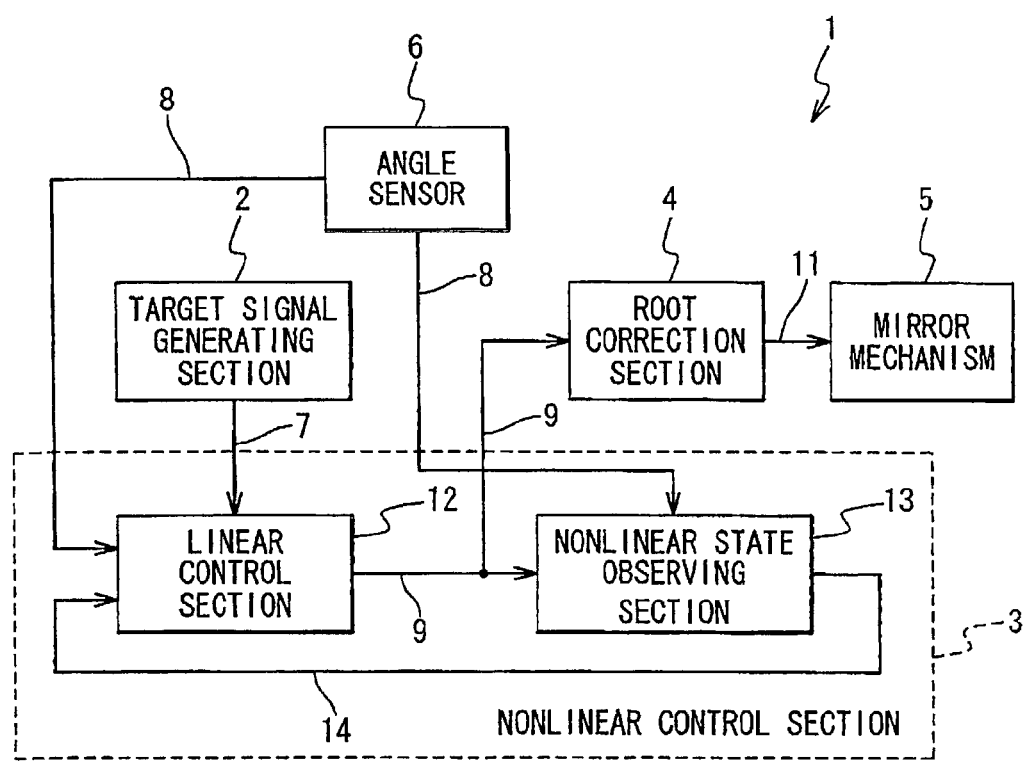
FIG. 5 is a block diagram showing a MEMS mirror system as a micro movable mechanism system according to a first embodiment of the present invention.

The optical switch 1 as the MEMS mirror system according to the first embodiment of the present invention is shown in FIG. 5. Referring to FIG. 5, the optical switch 1 is composed of a target signal generating section 2, a nonlinear control section 3, a root correction section 4, a mirror mechanism 5 and an angle sensor 6.

The target signal generating section 2 outputs a target angle signal 7 to the nonlinear control section 3. The target signal 7 indicates a target angle of the movable electrode section 21. Also, the target signal 7 may indicate a target angle profile which means change in the angle θ of the movable electrode section 21, a target angular velocity of the movable electrode section 21, a target angular velocity profile which means change in an angular velocity θ of the movable electrode section 21, or a target angular acceleration of the movable electrode section 21.

The angle sensor 6 measures the angle θ of the movable electrode section 21 of the mirror mechanism 5 to output an angle signal 6 indicating the measured angle θ to the nonlinear control section 3. The angle sensor 6 measures an electrostatic capacity between the movable electrode section 21 and the fixed electrode section to derive a signal indicative of the angle θ based on the electrostatic capacity. Otherwise, the angle sensor 6 may measure an angle of a laser beam reflected from the mirror mechanism 5 to derive the signal indicative of the angle θ based on the measured laser beam angle.

The nonlinear control section 3 outputs a controller output signal 9 to the root correction section 4 based on the target signal 7 and the angle signal 8. The nonlinear control section 3 derives a control value u as a function of an angular difference Δθ between the target angle θr and the current angle θ of the mirror surface 25. The controller output signal 9 indicates the control value u.

The root correction section 4 outputs a signal of the drive voltage V 11 to the mirror mechanism 5 based on the controller output signal u 9. The drive voltage V is a nonlinear function of the control value u.

The mirror mechanism 5 changes the current angle θ of the movable electrode section 21 in response to the drive voltage V 11.

The nonlinear control section 3 has a linear control section 12 and a nonlinear state observing section 13. The nonlinear state observing section 13 sets an angular motion equation of the movable electrode section 21 based on the angle signal 8 and the controller output signal 9, and estimates an angular velocity ωo of the movable electrode section 21 of the mirror mechanism 5. Then, the nonlinear state observing section 13 outputs a mirror state estimation signal 14 indicating the estimated angular velocity ωo, to the linear control section 12. That is, the nonlinear state observing section 13 substitutes the inputted angle θ and the controller output signal u into the following equation (9) to derive angular velocity dθ/dt as the estimated angular velocity ω:

$$J\frac{d^2\theta}{dt^2} + C\frac{d\theta}{dt} + K\theta = Bf(\theta)u \tag{9}$$

Here, the above equation (9) is derived from the equations (1) and (3). It should be noted that the mirror state estimation signal 14 may indicate an estimated angle or an estimated angular acceleration.

The linear control section 12 carries out PID control and outputs the controller output signal 9 based on the target signal 7, the angle signal 8, and the mirror state estimation signal 14. The output of the linear control section 12 is the controller output signal 9 from the nonlinear control section 3.

The linear control section 12 generates and outputs the controller output signal 9 for each sampling period Ts. The control value u indicated by the controller output signal 9 is expressed by the following equation (10):

$$u = K_p\Delta\theta + K_d\overline{\omega}_o + K_iT_sX_i \tag{10}$$

where Δθ is an angular difference, ωo is the estimated angular velocity, Ts is the sampling period, Kp, Ki and Kd are constants, and Xi is an integration value. Here, the angular difference Δθ is expressed by the following equation (11):

$$\Delta\theta = \theta - \theta r \tag{11}$$

where θ is the current angle and θr is the target angle. Also, the integration value Xi is the sum of the angular differences (a series of the sequence {Δθ}) from the start of control of the linear control section 12.

In another example, the linear control section 12 carries out phase control, optimal control, H∞ control, and model matching control and so on and outputs the controller output signal 9 based on the target angle signal 7, the angle signal 8 and the mirror state estimation signal 14. The linear control section 12 generates and outputs the controller output signal 9 for every sampling period Ts. The control value u indicated by the controller output signal 9 is expressed by the following equations (12) and (13):

$$\frac{dX}{dt} = AX_c + B\overline{\omega}_o \tag{12}$$

$$u = CX_c + D\overline{\omega}_o$$

where Xobs is a mirror state estimation signal, ωo is the estimated angular velocity by the nonlinear state observing section, and A, B, C, and D are constant number matrices. Here, the constant number matrices A, B, C, D are derived from the phase control, the optimal control, the H∞ control, and the model catching control and so on.

Figure 6:
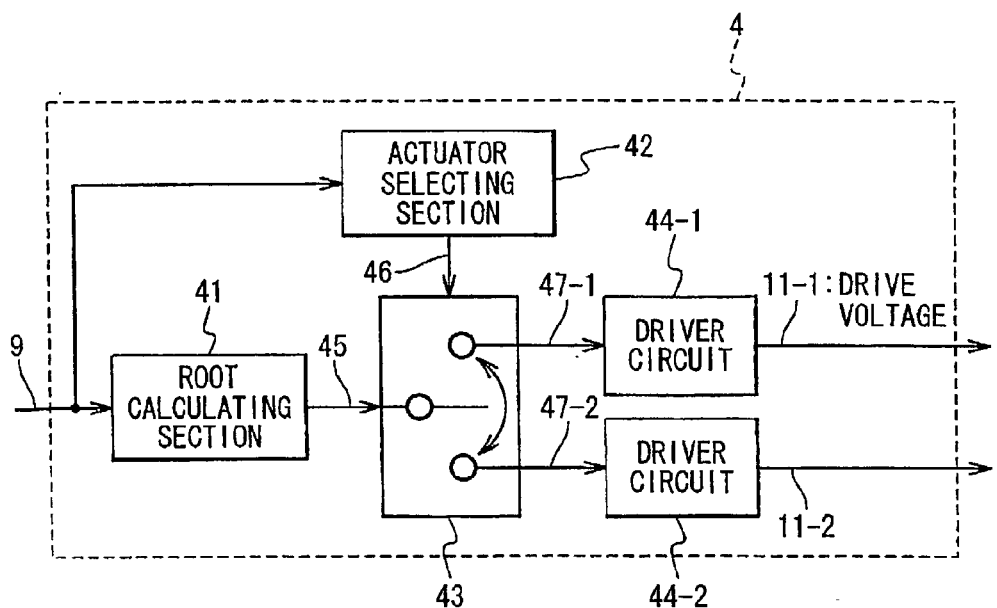
FIG. 6 is a block diagram showing a root correction section according to the first embodiment of the present invention.

FIG. 6 shows the root correction section 4 in detail. Referring to FIG. 6, the root correction section 4 is composed of a root calculating section 41, an actuator selecting section 42, a driver circuit selector 43, and driver circuits 44-1 and 44-2.

The root calculating section 41 derives a square root of an absolute value of the control value u indicated by the controller output signal 9, and outputs a voltage signal 45 indicating a value corresponding to the square root to the driver circuit selector 43. The root calculating section 41 extracts the square root using a function in a library of a CPU. Otherwise, the root calculating section 41 may use an approximation equation approximating a square root extraction function by four fundamental operations to derive the square root. Also, the root calculating section 41 may use a table storing all values of the square root of the absolute value of the control value u to derive the square root, or may use a table storing discrete values relating with the square root of the absolute value of the control value u to derive the square root through interpolation between two of the discrete values corresponding to the control value u.

The actuator selecting section 42 outputs a switching signal 46 to the driver circuit selector 43 based on the sign of the control value u. The switching signal 46 indicates any one of the driver circuits 44-1 and 44-2. The actuator selecting section 42 derives the sign of the control value u to generate the switching signal 46 indicating the driver circuit 44-1 in case of the positive sign and the driver circuit 44-2 in case of the negative sign.

The driver circuit selector 43 transfers the drive voltage signal 45 as a drive signal 47-i (i=1, 2) to the driver circuit 44-i selected based on the switching signal 46. The driver circuit 44-i applies to the fixed electrode 22-i, the drive voltage V 11-i indicated by the drive signal 47-i.

Figure 7:
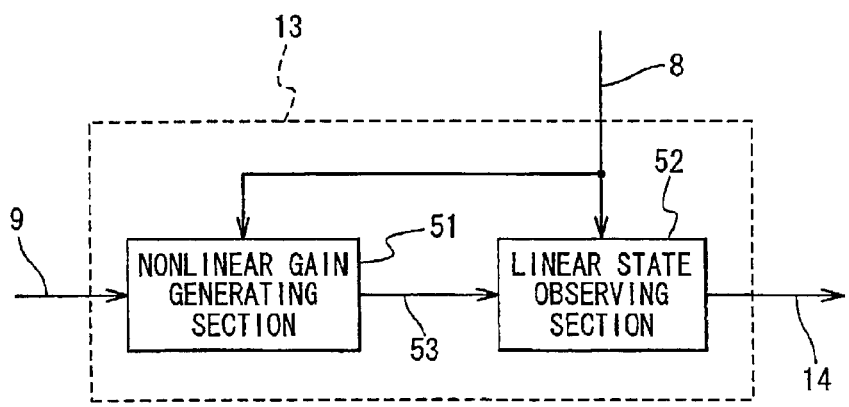
FIG. 7 is a block diagram showing a nonlinear state observing section according to the first embodiment of the present invention.

FIG. 7 shows the nonlinear state observing section 13 in detail. Referring to FIG. 7, the nonlinear state observing section 13 is composed of a nonlinear gain generating section 51 and a linear state observing section 52.

The nonlinear gain generating section 51 outputs to the linear state observing section 52, a torque signal 53 indicating the torque Tq acting on the movable electrode section 21 based on the angle signal 8 and the controller output signal 9. The nonlinear gain generating section 51 has a constant B and derives the nonlinear gain $f(\theta)$ based on the current angle $\theta$ indicated by the angle signal 8 and derives the torque Tq based on the equation (2).

The nonlinear gain generating section 51 derives the nonlinear gain $f(\theta)$ using the approximation equation approximating by four fundamental operations from the angle $\theta$, uses a table corresponding all values obtainable by the angle $\theta$ with the nonlinear gain $f(\theta)$ to derive the nonlinear gain $f(\theta)$ or uses a table corresponding discrete values of the angle $\theta$ with the nonlinear gain $f(\theta)$ close for to the interpolation from obtained two discrete values angle $\theta$ to derive the nonlinear gain $f(\theta)$.

The linear state observing section 52 generates the mirror state estimation signal 14 based on the torque signal 53 and the angle signal 8. The output of the linear state observing section 52 is the output of the nonlinear state observing section 13. The linear state observing section 52 substitutes the torque Tq and the angle $\theta$ into equation (1) to derive the angular velocity $d\theta/dt$ as the estimated angular velocity $\omega o$.

Nonlinear control generally needs a nonlinear gain for each parameter. In the optical switch 1, a linear control block and a nonlinear control block are operated independently to reduce nonlinear parameters. Thus, the optical switch 1 can execute nonlinear control in a simpler construction.

Figure 8:
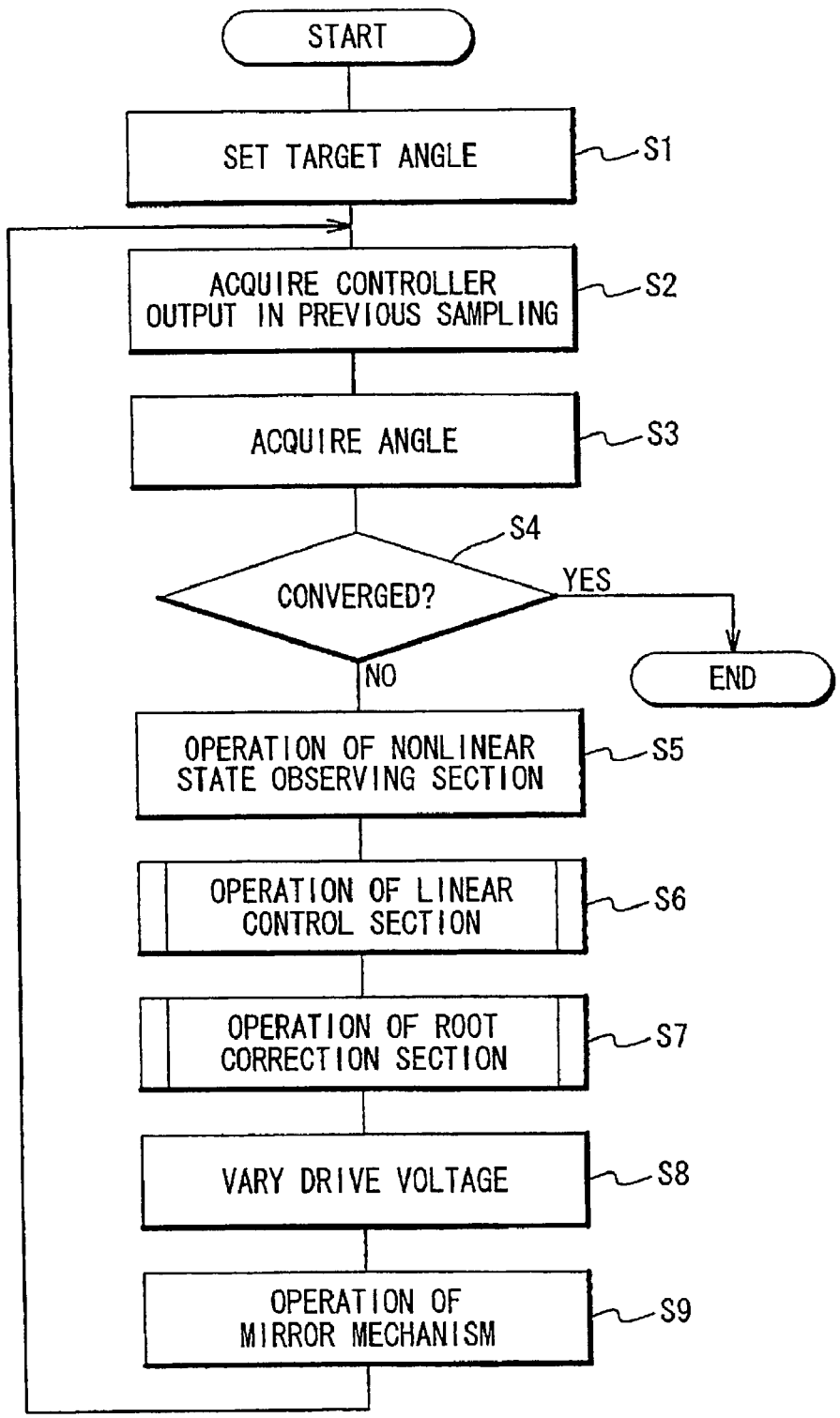
FIG. 8 is a flowchart showing the operation of a MEMS mirror control apparatus according to the first embodiment of the present invention.

FIG. 8 shows the operation of the MEMS mirror system according to the present invention. First, a target angle $\theta r$ is set by the target signal generating section 2 (step S1). The nonlinear control section 3 acquires the target angle $\theta r$ and acquires a control value u(k) derived in a previous sampling (the k-th sampling) (step S2), and acquires an angle $\theta(k)$ of the movable electrode section 21 measured by the angle sensor 6 (step S3). The nonlinear control section 3 determines whether or not the current angle $\theta(k)$ is converged, from the variation of the obtained angle $\theta(k)$ (step S4).

When the current angle $\theta(k)$ is converged, changing of the drive voltage V applied to the mirror mechanism 5 is terminated so as to hold the drive voltage V. When the current angle $\theta(k)$ is not converged, the nonlinear control section 3 estimates the angler velocity $\omega o(k)$ of the movable electrode section 21 based on the measured current angle $\theta(k)$ and the control value u(k) (step S5). The linear control section of the nonlinear control section 3 further executes PID control of the current angle $\theta(k)$ to derive the control value u(k) (step S6). The root correction section 4 executes root correction calculation based on the control value u(k) to derive a drive voltage V(k), and selects the fixed electrode 22-i applied with the drive voltage V(k) (step S7).

The root correction section 4 further applies the derived drive voltage V(k) to the mirror mechanism (step S8). The mirror mechanism 5 turns the movable electrode section 21 based on the applied drive voltage V(k) (step S9). Thereafter, the routine enters a loop in which the steps S2 to S9 are repeatedly executed for each sampling period TS. The loop is repeated until the current angle $\theta(k)$ is converged or determined.

Figure 9:
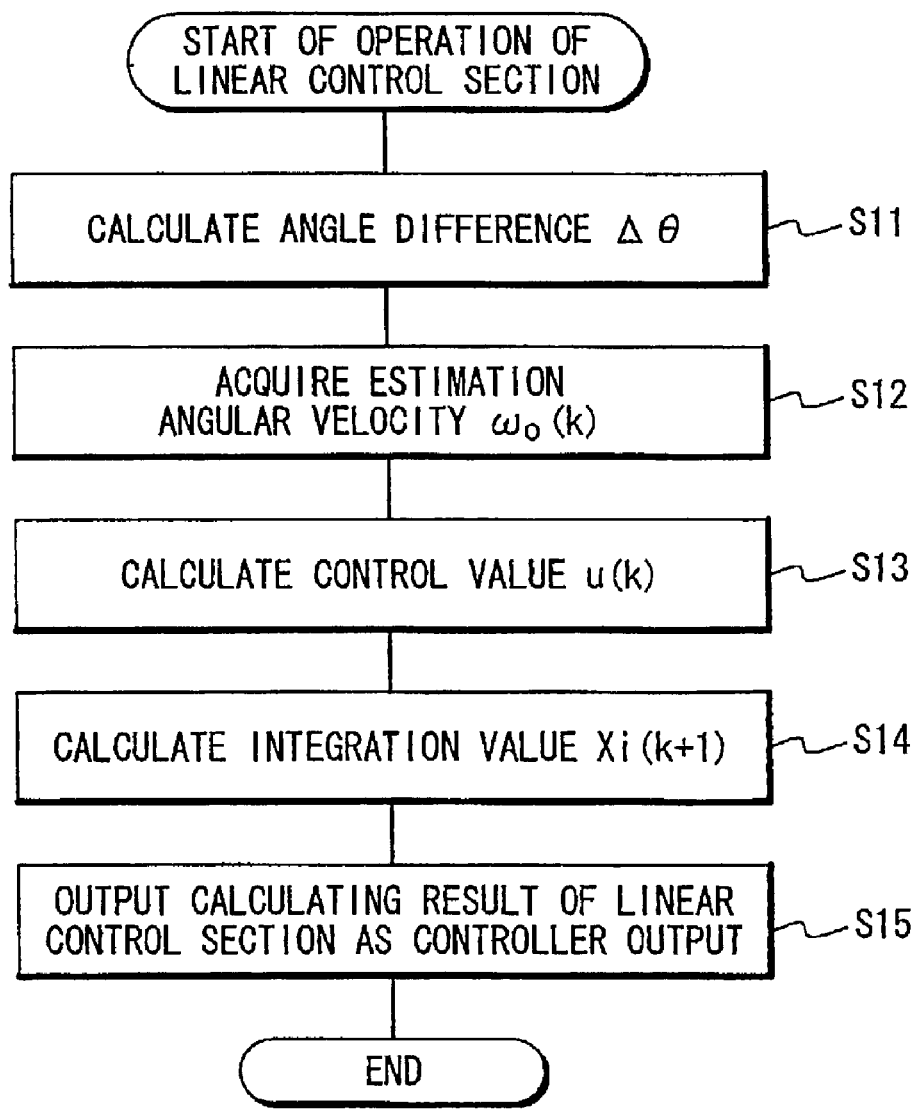
FIG. 9 is a flowchart showing the operation of the calculation of a linear control section.

FIG. 9 shows the operation of the linear control section at the step S6 in detail. The nonlinear control section 3 uses the inputted current angle $\theta(k)$ and the target angle $\theta r$ to derive an angular difference $\Delta\theta(k)$ expressed by the following equation (14):

$$\Delta\theta(k)=\theta(k)-\theta r \qquad (14)$$

(step S11).

The nonlinear control section 3 acquires the estimated angular velocity $\omega o(k)$ derived by the nonlinear observer 13 (step S12), and derives the control value u(k) based on the following equation (15) using an integration value Xi(k) derived in the previous sampling:

$$u(k)=K_p\Delta\theta(k)+K_d\omega_o(k)+K_iT_sX_i(k) \qquad (15)$$

The nonlinear control section 3 adds the angular difference $\Delta\theta(k)$ to the integration value Xi(k) to derive a new integration value Xi(k+1) used in the next sampling (step S14). The integration value Xi(k+1) is a sequence {Xi(k)} expressed by the following equation (16):

$$X_i(k+1)=X_i(k)+\Delta\theta(k) \qquad (16)$$

That is, the integration value Xi(k) is a series obtained by adding the first term to the k-th term of the sequence ($\Delta\theta(k)$). The nonlinear control section 3 outputs the derived control value u(k) to the root correction section 4 (step S15).

Figure 10:
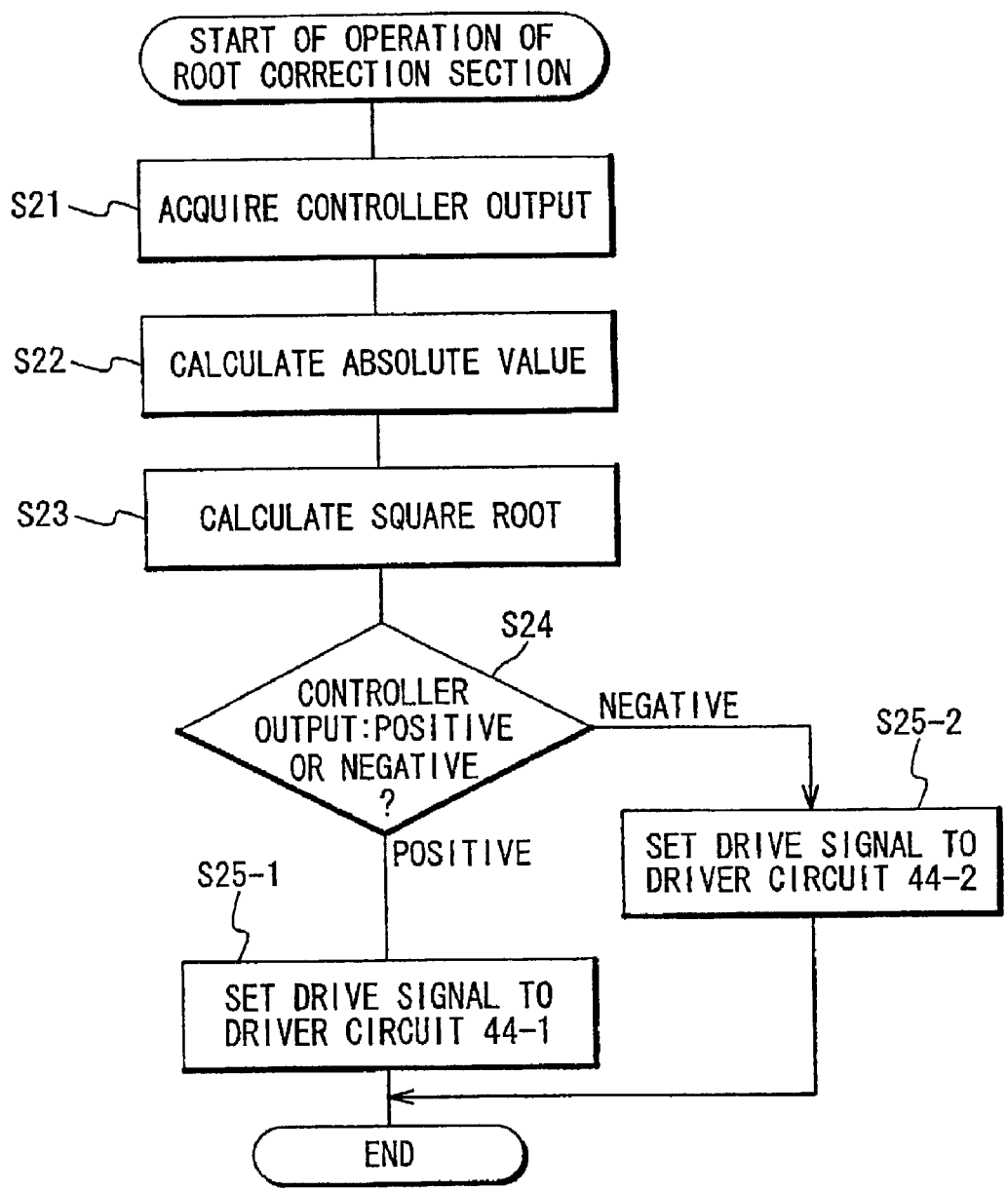
FIG. 10 is a flowchart showing the operation of the root correction section.

FIG. 10 is a flow chart showing the operation of the root correction section at step S7 in detail. The root correction section 4 acquires the control value u(k) (step S21) to derive its absolute value |u(k)| (step S22). The root correction section 4 calculates the square root of the absolute value |u(k)| to derive the drive voltage V(k) as its square root (step S23).

The root correction section 4 determines the sign of the control value u(k) (step S24). When the sign of the control value u(k) is positive (step S24; positive), the root correction section 4 outputs the drive voltage V(k) to the driver circuit 44-1 (step S25-1). When the sign of the control value u(k) is negative (step S24; negative), the root correction section 4 outputs the drive voltage V(k) to the driver circuit 44-2 (step S25-2)

Figure 11:
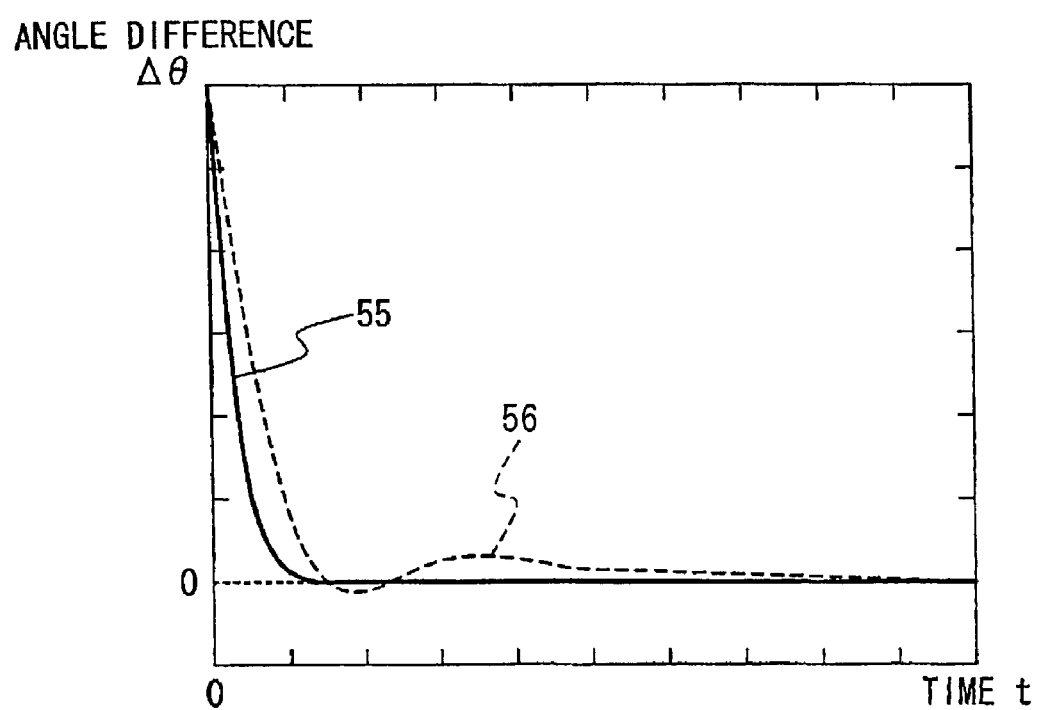
FIG. 11 is a graph showing change in an angular difference when the mirror mechanism is driven in the first embodiment of the present invention.

FIG. 11 shows a graph of the change 55 in the angular difference $\Delta\theta$ when the mirror mechanism 5 of the optical switch 1 is controlled in the present invention, and the change 56 in the angular difference when the mirror mechanism 5 of the optical switch is controlled based on the PID control. When the mirror mechanism is controlled based on only the PID control, the angular difference 56 is converged to the target angle θr while oscillating. On the contrary, in the MEMS mirror controlling method according to the present invention, the angular difference Δθ is converged to the target angle θr without oscillating and is converged more quickly than in the PID control.

When the movable electrode section 21 of the mirror mechanism 5 is controlled based on only the PID control, the range of the controllable angle θ is limited. However, the MEMS mirror control method according to the present invention can control the angle θ based on the angular motion equation of the movable electrode section 21 so as to make the range of the controllable angle wider than in the controllable range of the PID control. Also, the control method can control to reduce an error of estimation of the state amount in the range. As a result, the optical switch can switch more lines.

Figure 12:
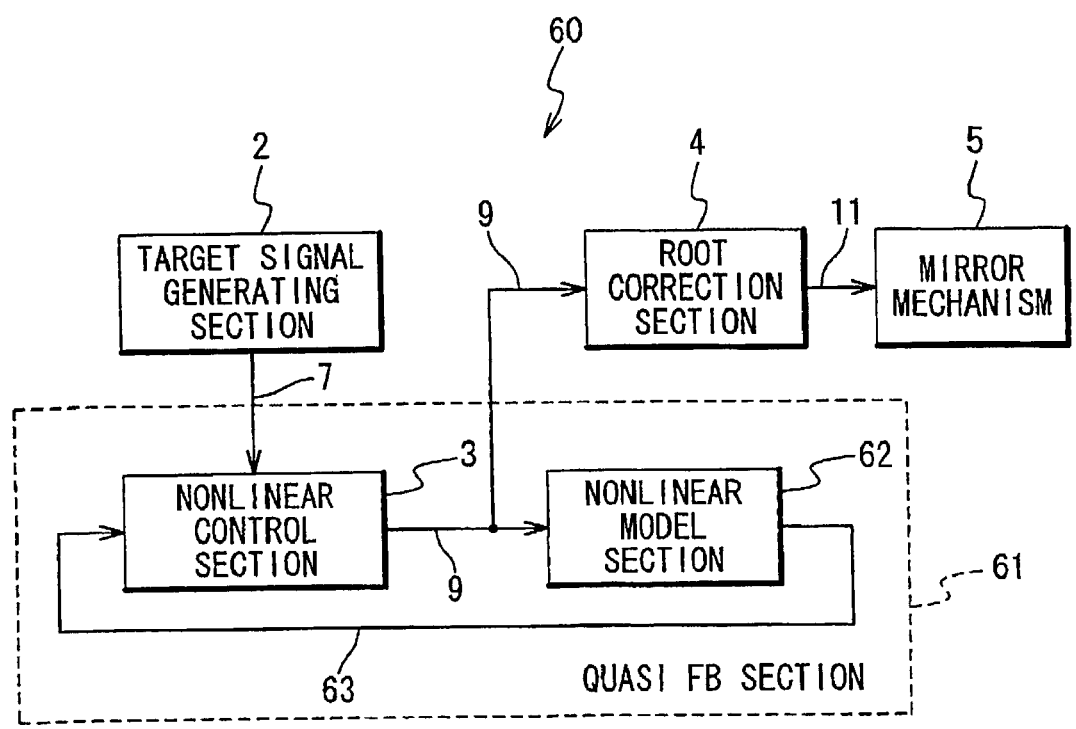
FIG. 12 is a block diagram showing the MEMS mirror system according to a second embodiment of the present invention.

FIG. 12 is a block diagram showing the MEMS mirror system according to a second embodiment of the present invention. In the MEMS mirror system according to the second embodiment of the present invention, the current angle θ of the movable electrode section 21 of the mirror mechanism 5 is derived from a mathematical model without any actual measurement. As shown in FIG. 12, in an optical switch 60 to which the MEMS mirror control is applied, the MEMS mirror system is composed of a target signal generating section 2, a quasi feedback (FB) system 61, the root correction section 4, and the mirror mechanism 5. The quasi feedback system 61 is composed of the nonlinear control section 3 and the nonlinear model section 62.

The target signal generating section 2 outputs the target signal 7 to the nonlinear control section 3. The nonlinear model section 62 has a mathematical model and derives through calculation, the current angle θ of the movable electrode of the mirror mechanism 5 based on the controller output signal 9 outputted by the nonlinear control section 3, and outputs an angle signal 63 indicating the current angle θ to the nonlinear control section 3. The mathematical model is the angular motion equation shown in the equation (9).

The nonlinear control section 3 outputs the controller output signal 9 indicating the control value u to the root correction section 4, based on the target signal 7 and the angle signal 63. The root correction section 4 outputs the drive voltage 11 to the mirror mechanism 5 based on the controller output signal 9. The mirror mechanism 5 changes the current angle θ of the movable electrode 21 in response to the drive voltage 11.

In the above-mentioned MEMS mirror system, it is not necessary to provide an angle sensor measuring the current angle θ of the movable electrode section 21. For this reason, the current angle of the movable electrode section 21 can be controlled in a wide range without increase of the manufacturing cost. As a result, the optical switch can handle more lines.

Figure 13:
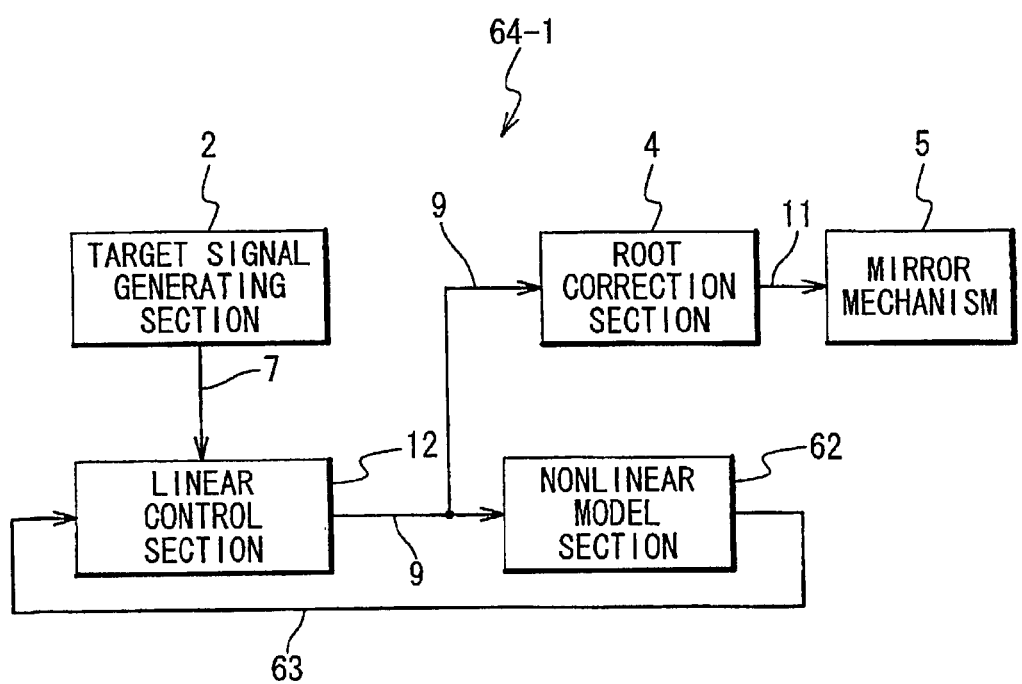
FIG. 13 is a block diagram showing a coarse control system of the MEMS mirror system according to a third embodiment of the present invention.

In the optical switch 64-1 to which the MEMS mirror system according to the third embodiment of the present invention is applied, a plurality of control systems are provided. One of the control systems is a coarse control system 64-1, and the other is a fine control system 64-2. FIG. 13 is a block diagram showing the coarse control system 64-1 of the MEMS mirror system according to the third embodiment of the present invention. The coarse control system of the MEMS mirror system 64-1 is composed of a target signal generating section 2, a linear control section 12, a nonlinear model section 62, a root correction section 4 and a mirror mechanism 5, as shown in FIG. 13.

The target signal generating section 2 outputs the target signal 7 to the linear control section 12. The nonlinear model section 62 has a mathematical model, derives through calculation the current angle θ of the movable electrode of the mirror mechanism 5 based on the controller output signal 9 outputted by the linear control section 12, and outputs the angle signal 63 indicating the angle θ to the linear control section 12. The mathematical model is the angular motion equation of the equation (9).

The linear control section 12 carries out the PID control and outputs the controller output signal 9 indicating the control value u to the root correction section 4 based on the target signal 7 and the angle signal 63. The root correction section 4 outputs the drive voltage 11 to the mirror mechanism 5 based on the controller output signal 9. The mirror mechanism 5 changes the current angle θ of the movable electrode section 21 in response to the drive voltage 11.

Figure 14:
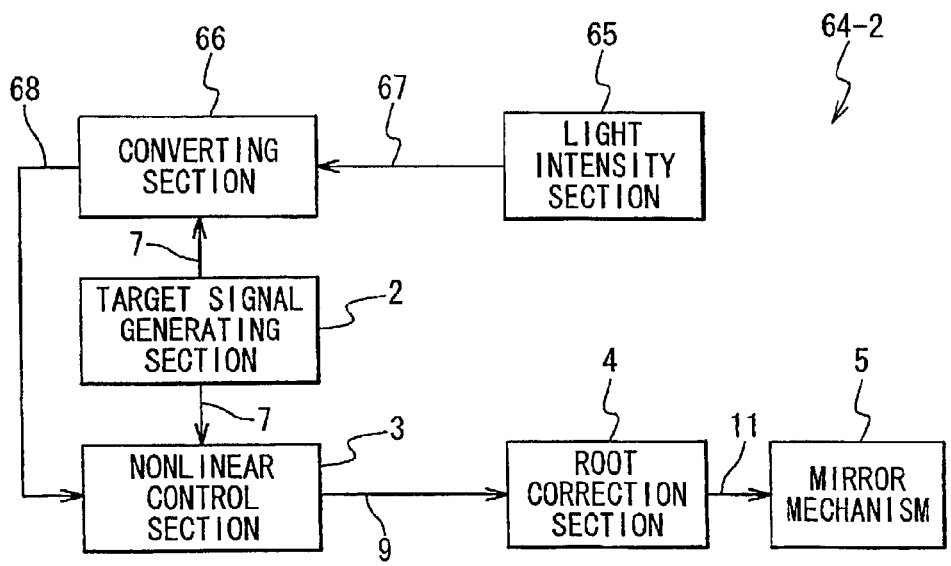
FIG. 14 is a block diagram showing a fine control system of the MEMS mirror system according to the third embodiment of the present invention.

Another of the control systems is a fine control system 64-2. FIG. 14 is a block diagram showing the fine control system of the MEMS mirror system in the third embodiment of the present invention. The fine control system of the MEMS mirror system 64-2 is composed of a target signal generating section 2, a nonlinear control section 3, a root correction section 4, a mirror mechanism 5, a light intensity sensor 65 and a converting section 66, as shown in shown in FIG. 14.

The target signal generating section 2 outputs the target signal 7 to the nonlinear control section 3, as in the optical switch 60. As in the optical switch 61, the nonlinear model section 62 derives the current angle θ of the movable electrode of the mirror mechanism 5 based on the controller output signal 9 outputted by the nonlinear control section 3 to output the angle signal 63 indicating the angle θ to the nonlinear control section 3

The nonlinear control section 3 outputs the controller output signal 9 indicating the control value u to the root correction section 4 based on the target signal 7 and the angle signal 63. Otherwise, the nonlinear control section 3 outputs the controller output signal 9 indicating the control value u to the root correction section 4 based on the target signal 7 and a micro angle signal 68 outputted by the converting section 66. The root correction section 4 outputs the drive voltage 11 to the mirror mechanism 5 based on the controller output signal 9, as in the optical switch 61. The mirror mechanism 5 changes the current angle θ of the movable electrode section 21 in response to the drive voltage 11.

The light intensity sensor 65 measures a light intensity of a laser beam inputted to the output side optical fiber to output a light intensity signal 67 indicating the light intensity to the converting section 66. The converting section 66 derives the angular difference Δθ based on the light intensity to output the micro angle signal 68 indicating the angular difference Δθ to the nonlinear control section 3. The micro movable mechanism system according to the third embodiment of the present invention measures the light intensity of the laser beam inputted to the input side optical fiber without measuring the current angle θ of the movable electrode section 21 of the mirror mechanism 5.

Figure 15:
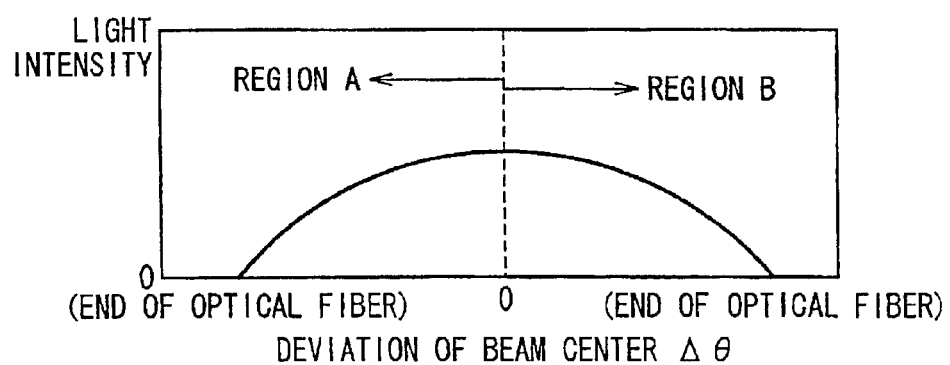
FIG. 15 is a graph showing a relation between an angular difference and light intensity.

FIG. 15 is a graph showing a relation between the angular difference Δθ and the light intensity. The angular difference Δθ indicates the difference between the center of the beam spot of the laser beam and the center of a light receiving region of the output side optical fiber. The light intensity is a function of an amount deviated from the light center. The light intensities corresponding to the two deviation amounts whose absolute values are equal. Therefore, the light intensity is an even function of the angular difference $\Delta\theta$. The absolute value of the deviation amount can be estimated based on the light intensity.

Figure 34:
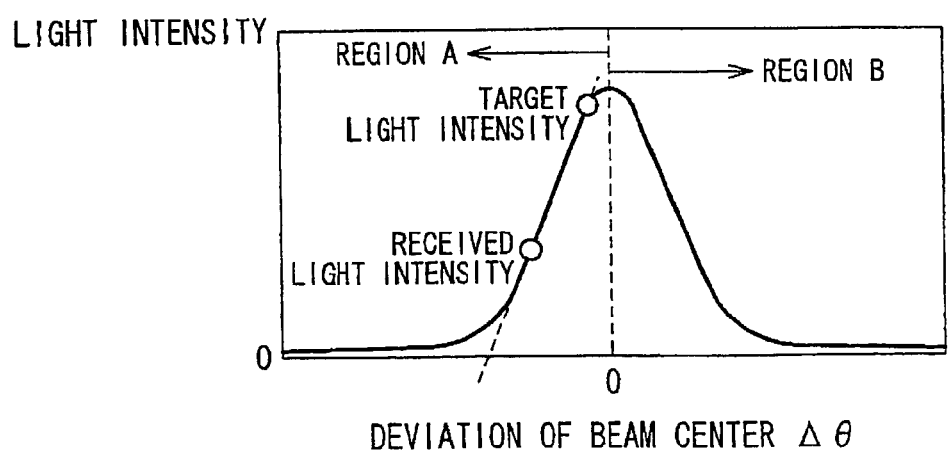
FIG. 34 is a graph when the light intensity has a Gaussian distribution.

FIG. 34 is a graph when the light intensity has a Gaussian distribution. For example, it is supposed that a difference between the received light intensity p and the target light intensity pref is a target light intensity difference $\Delta p$. Also, the angular difference $\Delta\theta$ shows a difference between the center of the laser beam spot and the center in the light receiving area of the output side optical fiber. When the received light intensity is higher than a predetermined level, the light intensity difference $\Delta p$ is approximately proportional to the angular difference $\Delta\theta$ (linear). Therefore, the converting section 66 outputs to the nonlinear control section 3, an approximated value obtained by multiplying the light intensity difference $\Delta p$ by a constant number as the micro angle signal 68, without calculating the angular difference $\Delta\theta$ based on the Gaussian distribution.

Figure 16:
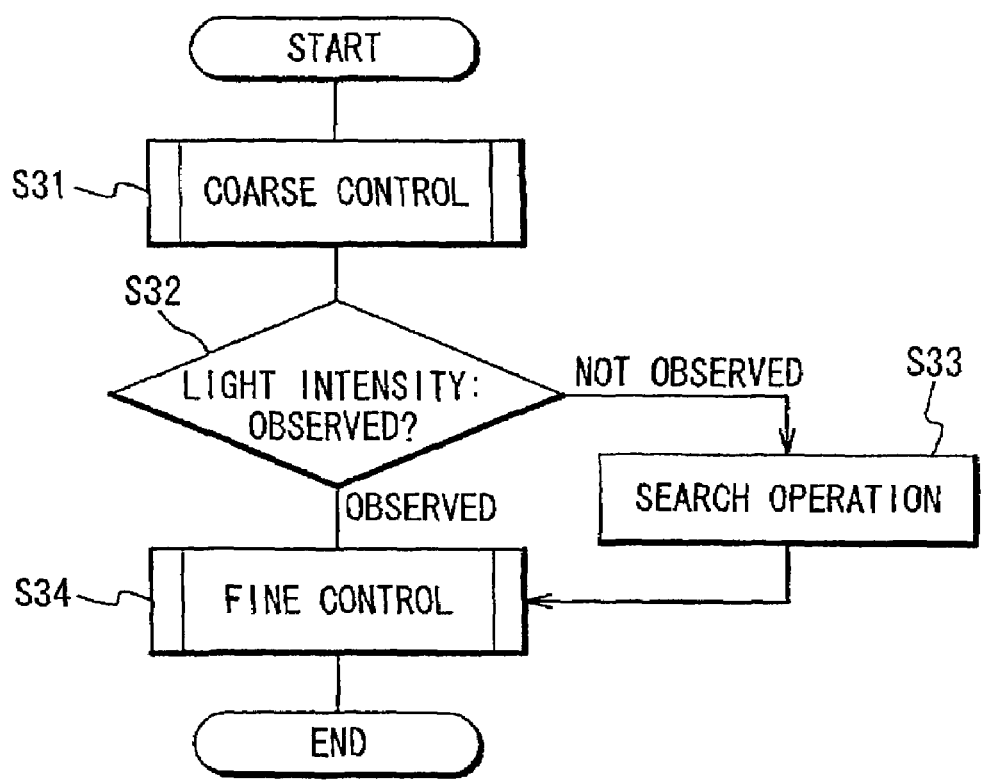
FIG. 16 is a flowchart showing the operation of the MEMS mirror system according to the third embodiment of the present invention.

FIG. 16 is a flow chart showing the operation of the MEMS mirror system according to the third embodiment of the present invention as the optical switch 64. The coarse control of the optical switch 64 is carried out (step S31). The coarse control corresponds to the steps S1 to S9 of FIG. 8. When the intensity of the laser beam is not observed by the light intensity sensor 65 and the current angle $\theta$ of the movable electrode section 21 is converged (step S32: not observed), a search operation is carried out (step S33). Then, the fine control is executed (step S34). When the light intensity of the laser beam is observed by the light intensity sensor 6S during the coarse control (step S32; observed), the coarse control is terminated to carry out the fine control (step S34).

Figure 17:
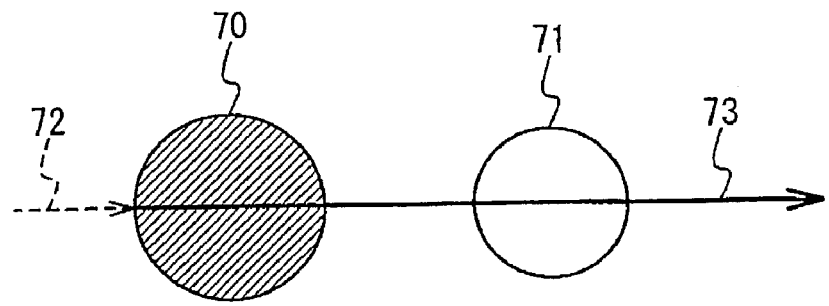
FIG. 17 is a diagram showing a movement of a light beam spot during a search operation.

FIG. 17 shows the movement of the beam spot during the search operation of the step S33. The beam spot 70 moves through a path 72 during the coarse control of the step S31 and is converged to a position which does not overlapped with the light receiving region 71. The beam spot 70 moves through a path 73 extending from the path 72 during the search operation of the step S33. When the beam spot 70 overlaps with the light receiving region 71, the search operation is terminated.

Figure 18:
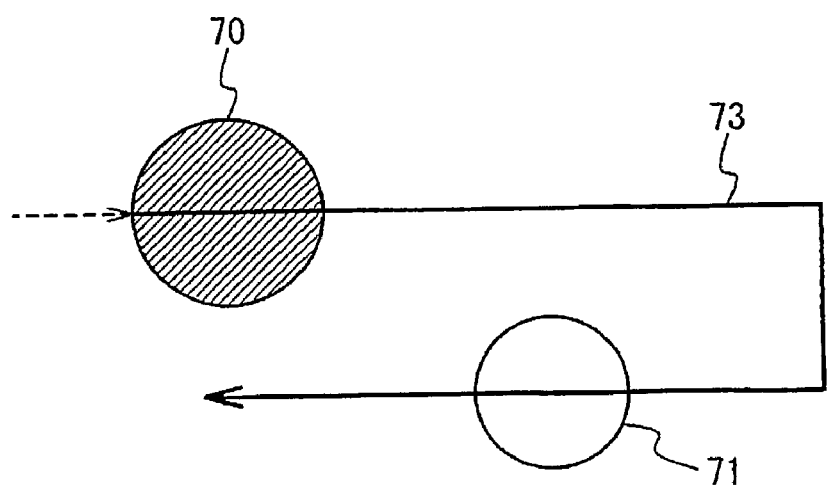
FIG. 18 is a diagram showing another movement of the light beam spot during the search operation.

FIG. 18 shows the movement of the beam spot during another search operation of the step S33 when the movable electrode section 21 of the optical switch 64 is turned around two axes and is controlled two-dimensionally. After the beam spot 70 is converged to a position different from the light receiving region 71, one of two axes is fixed and the mirror mechanism is driven by a predetermined angle with respect to the other axis to move the beam spot 70. When the beam spot 70 does not overlap with the light receiving region 71, the mirror mechanism is driven with respect to the one axis by a predetermined step width and the mirror mechanism is driven with respect to the other axis by the predetermined angle in the opposite direction to the previous movement direction. The step width is shorter than the diameter of the beam spot. When the beam spot 70 does not still overlap with the light receiving region 71, the operation is repeated in which the mirror mechanism is driven with respect to the one axis by a predetermined step width and the mirror mechanism is driven with respect to the other axis by the predetermined angle in the opposite direction. When the beam spot 70 overlaps with the light receiving region 71, the search operation is terminated.

Figure 19:
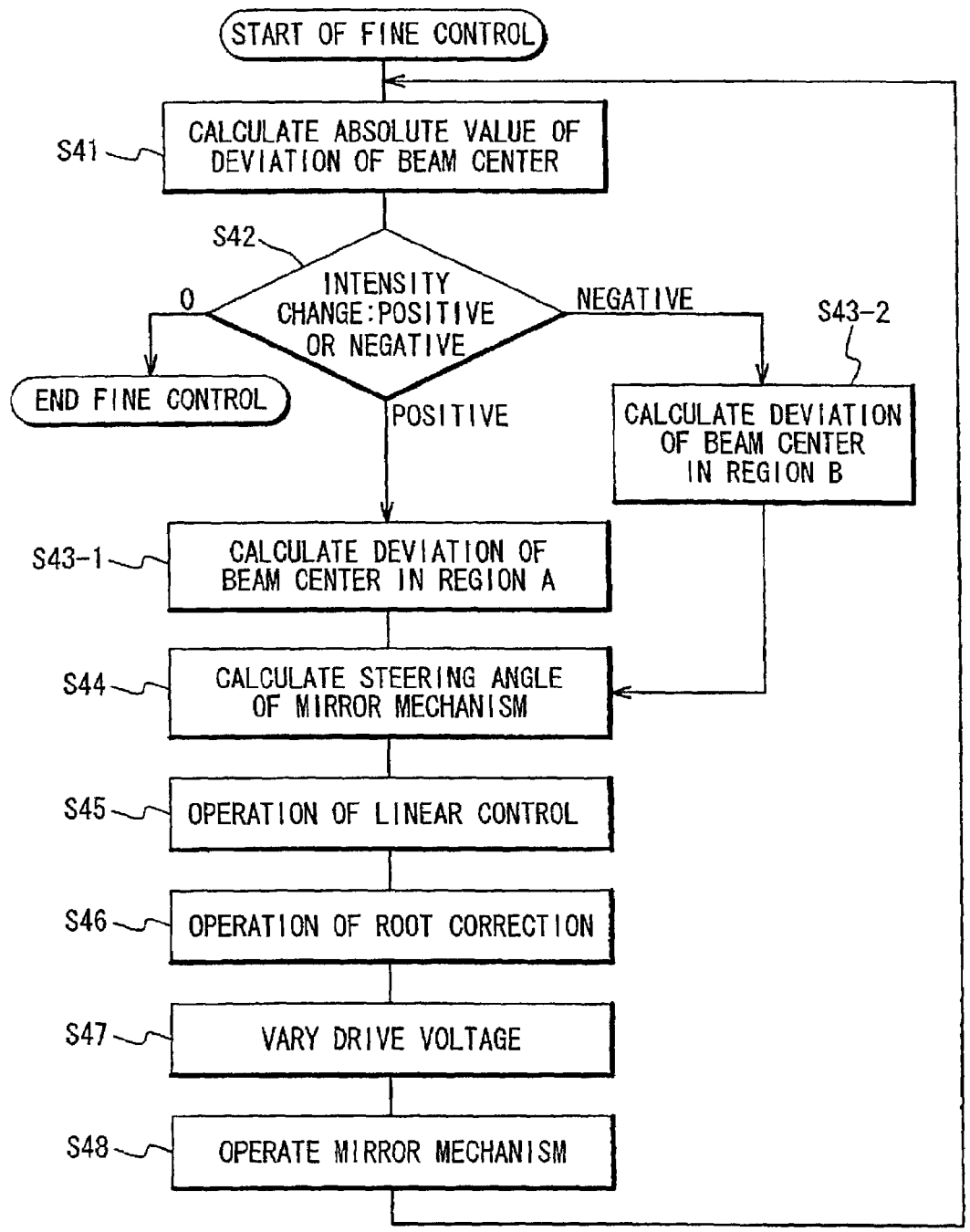
FIG. 19 is a flowchart showing a fine control in the MEMS mirror system in the third embodiment.

FIG. 19 shows the fine control of the step S34 in detail. An absolute value of the angular difference $\Delta\theta$ is derived based on the light intensity measured by the light intensity sensor 65 (step S41). The sign of the variation of the light intensity is determined (step S42). When the variation is negative (step S42; negative), the sign of the angular difference $\Delta\theta$ is set negative (step S43-1). When the variation is positive (step S42; positive), the sign of the angular difference $\Delta\theta$ is set positive (step S43-2). When the angular difference $\Delta\theta$ is converged to 0 (step S42; 0), the fine control is terminated The angular difference $\Delta\theta$ is derived based on the absolute value and sign of the angular difference $\Delta\theta$ (step S44). Then, calculation of PID control is carried out based on the angular difference $\Delta\theta$ to derive the control value u (step S45). The angular difference $\Delta\theta$, the differential value and the integration value Xi are used to derive the control value u. The control value u is subjected to the calculation of a square root to derive the drive voltage V (step S46). The drive voltage V is applied to the fixed electrode 22 (step S47). In the mirror mechanism 5, the movable electrode section 21 is turned based on the applied drive voltage V (step S48). After that, the control enters a loop in which the steps S41 to S48 are repeatedly carried out for each sampling period $T_s$. The loop is repeated until the angular difference $\Delta\theta$ is converged.

Figure 20:
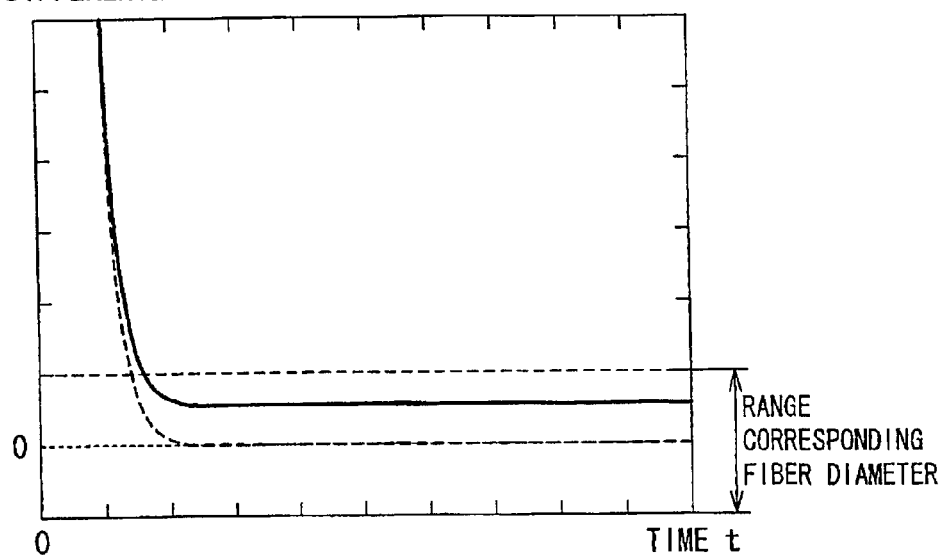
FIG. 20 is a graph showing a change in an angular difference on a coarse control when the angle of the movable electrode is derived based on a mathematical model having a modeling error.

FIG. 20 shows the change in the angular difference $\Delta\theta$ when the current angle $\theta$ of the movable electrode section 21 is derived based on the mathematical model having a modeling error. The modeling error is initially generated when the angular motion equation is set or is generated through the calculation. As the modeling error generated through the calculation, a change in the damping C is shown. The angular difference $\Delta\theta$ can be converged quickly without oscillation, but cannot be converged to 0.

Figure 21:
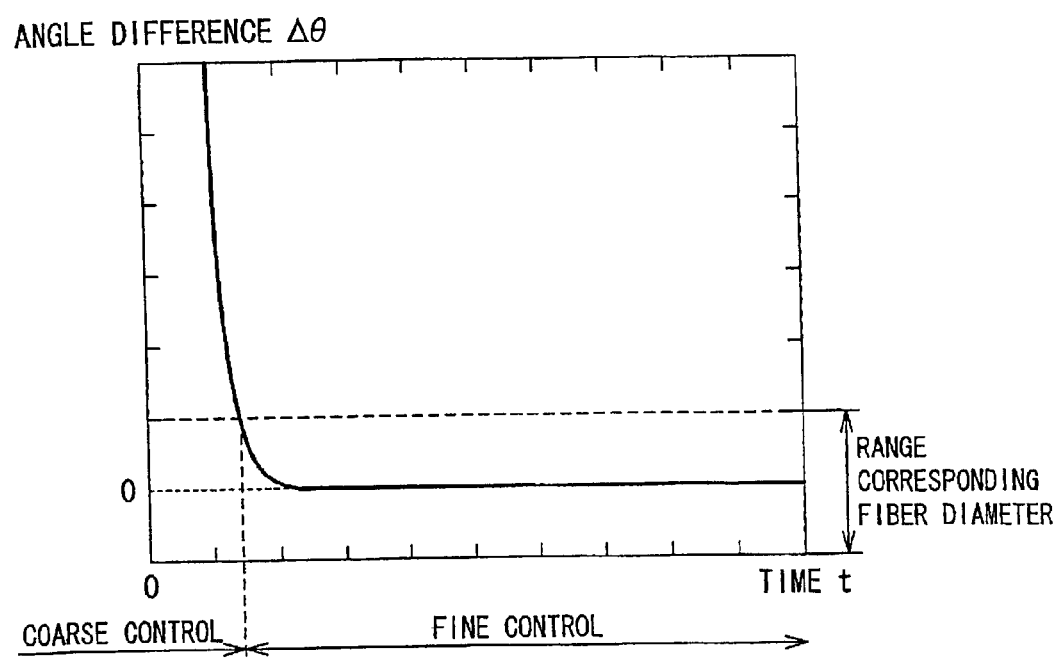
FIG. 21 is a graph showing a change in the angular difference when the coarse control and the fine control are carried out.

FIG. 21 shows a change in the angular difference $\Delta\theta$ when the mirror mechanism 5 of the optical switch 1 is controlled based on the coarse control and the fine control, and timing switching from the coarse control to the fine control. The angular difference $\Delta\theta$ is first controlled based on the coarse control, and the angular difference $\Delta\theta$ approaches 0. Then, when the angular difference $\Delta\theta$ reaches the range corresponding to the diameter of the optical fiber by the coarse control, the control is switched to the fine control. The angular difference $\Delta\theta$ is controlled again by the fine control and is finally converged to 0.

Figure 22:
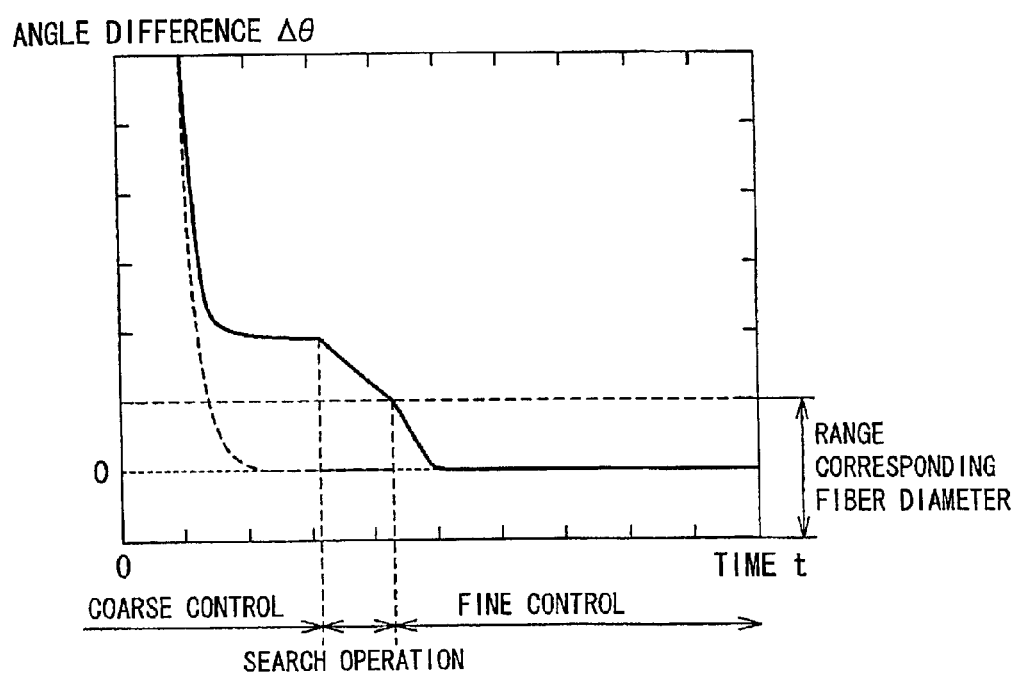
FIG. 22 is a graph showing a change in the angular difference when the coarse control, the search operation and the fine control are carried out.

FIG. 22 shows a change in the angular difference $\Delta\theta$ when the mirror mechanism 5 of the optical switch 1 is controlled by the coarse control and the fine control, timing switching from the coarse control to the search operation and timing switching from the search operation to the fine control. The angular difference $\Delta\theta$ is first controlled by the coarse control, and then the angular difference $\Delta\theta$ becomes close to 0. When the angular difference $\Delta\theta$ is converged outside of the range corresponding to the diameter of the optical fiber by the coarse control, the control is switched from the coarse control to the search operation. When the angular difference $\Delta\theta$ becomes close to 0 in the search operation to reach the range corresponding to the diameter of the optical fiber, the control is switched from the search operation to the fine control. The angular difference $\Delta\theta$ is controlled again by the fine control and is finally converged to 0.

Figure 23:
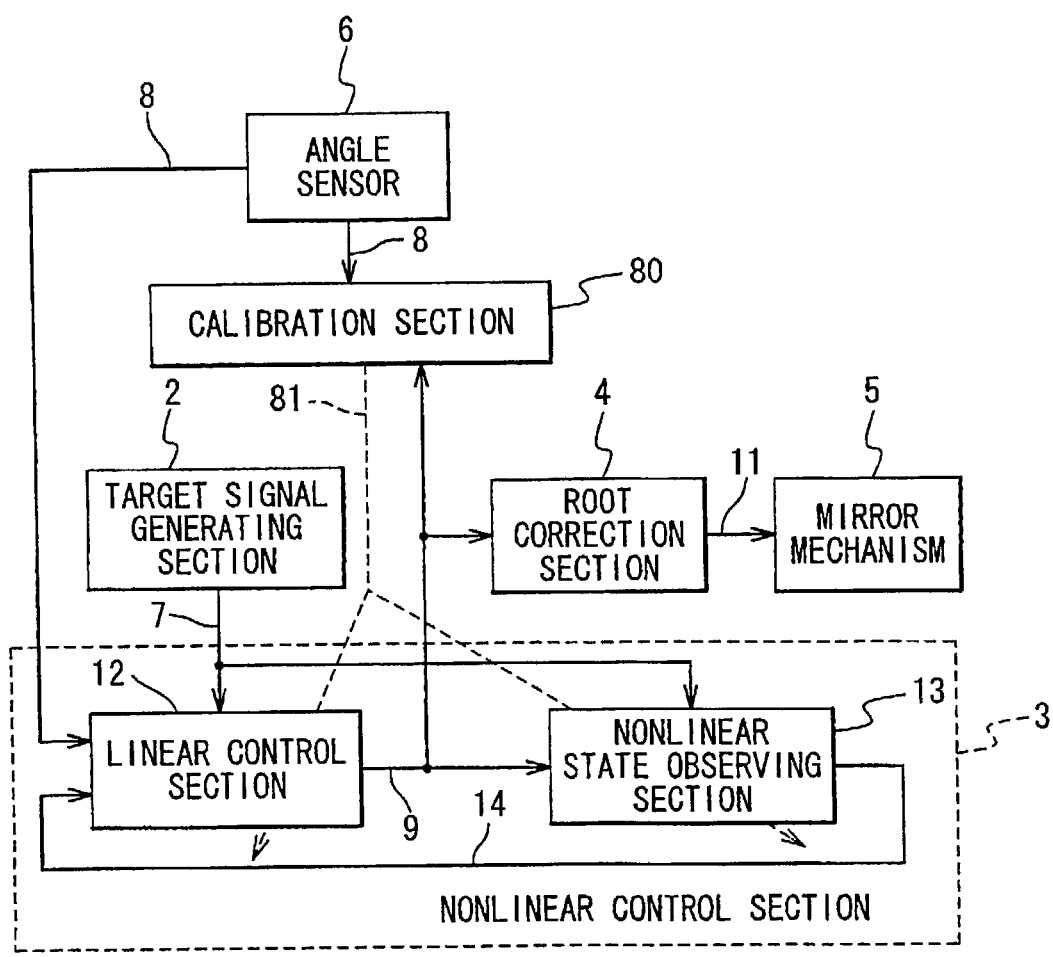
FIG. 23 is a block diagram showing the MEMS mirror system according to a fourth embodiment of the present invention.

FIG. 23 is a block diagram showing the MEMS mirror system according to the fourth embodiment of the present invention. In the optical switch to which the MEMS mirror system according to the fourth embodiment of the present invention is applied, a calibration section 80 is provided. As shown in FIG. 23, the angle sensor 6 of the optical switch outputs the angle signal 8 to a calibration section 80. The nonlinear control section 3 outputs the controller output signal to the calibration section 80.

The calibration section 80 outputs a correction value signal 81 to the nonlinear control section 3 based on the angle signal 8 and the controller output signal 9. The calibration section 80 derives a correction value of input and output gain of the movable electrode section 21 based on the control value u and a change in the current angle of the movable electrode section 21. The correction value signal 81 indicates the correction value. The correction value indicates constants for correcting the constants Kp, Ki and Kd as coefficients in the equation (10), the inertial moment J, damping C, and stiffness K as coefficients in the equation (9), or the electrode shapes L1, L2, D, W as the coefficients in the equation (6).

The linear control section 12 updates the constants Kp, Ki and Kd as the coefficients in the equation (10), or the fixed number matrices A, B, C and D as the coefficients in the equations (12) and (13) based on the correction value signal 81. The nonlinear state observing section 13 updates the inertial moment J, damping C, and stiffness K based on the correction value signal 81. It should be noted that the calibration section 80 is operated constantly or intermittently, or can be operated by an operation of an administrator.

The damping C of the supporting spring 23 supporting the movable electrode section 21 is changed with time. Otherwise, when dust is adhered to the movable electrode section 21, the inertial moment J is changed. The decrease of the modeling error improves the responsive characteristic.

Figure 24:
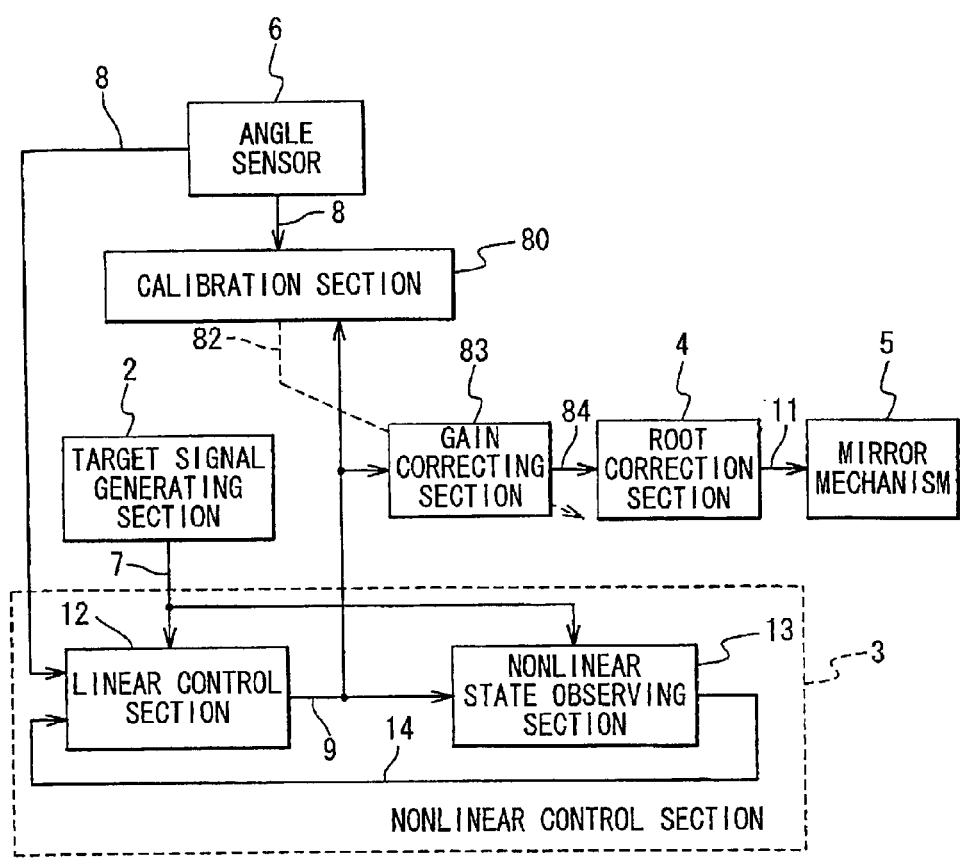
FIG. 24 is a block diagram showing the MEMS mirror system according to a fifth embodiment of the present invention.

FIG. 24 is a block diagram showing the MEMS mirror system according to the fifth embodiment of the present invention. In the optical switch to which the MEMS mirror system according to the fifth embodiment of the present invention is applied, a calibration section 80 and a gain correction section are provided. As shown in FIG. 24, the angle sensor 6 of the optical switch outputs the angle signal 8 to the calibration section 80. The nonlinear control section 3 outputs the controller output signal 9 to the calibration section 80.

The calibration section 80 outputs a correction value signal 82 to the gain correction section 83 based on the angle signal 8 and the controller output signal 9. The calibration section 80 derives a correction value of input and output gain of the movable electrode section 21 based on the control value u and the change in the current angle θ of the movable electrode section 21. The correction value signal 82 indicates the correction value. The correction value indicates constants for correcting the constant values Kp, Kd and Ki as the coefficients of the equation (10) or the inertial moment J, the damping C and the stiffness K as the coefficients of the equation (9). The gain correction section 83 outputs a gain correction controller output signal 84 to the root correction section 4 based on the controller output signal 9. The gain correction section 83 updates the gain based on the correction value signal 82 and corrects the control value based on the gain to derive the corrected control value u'. The gain correction controller output signal 84 indicates the control value u'.

The root correction section 4 outputs the drive voltage 11 to the mirror mechanism 5 based on the gain correction controller output signal 84. The root correction section 4 derives the drive voltage V based on the control value u'. The mirror mechanism 5 changes the current angle θ of the movable electrode section 21 in response to the drive voltage 11.

In the above-mentioned MEMS mirror system, the actual input and output characteristic of the movable electrode section 21 is made to coincide with the input and output characteristic of a design model of the movable electrode section 21. Thus, degradation of the responsive characteristic due to the modeling error can be prevented to ensure predetermined switching time.

Figure 25:
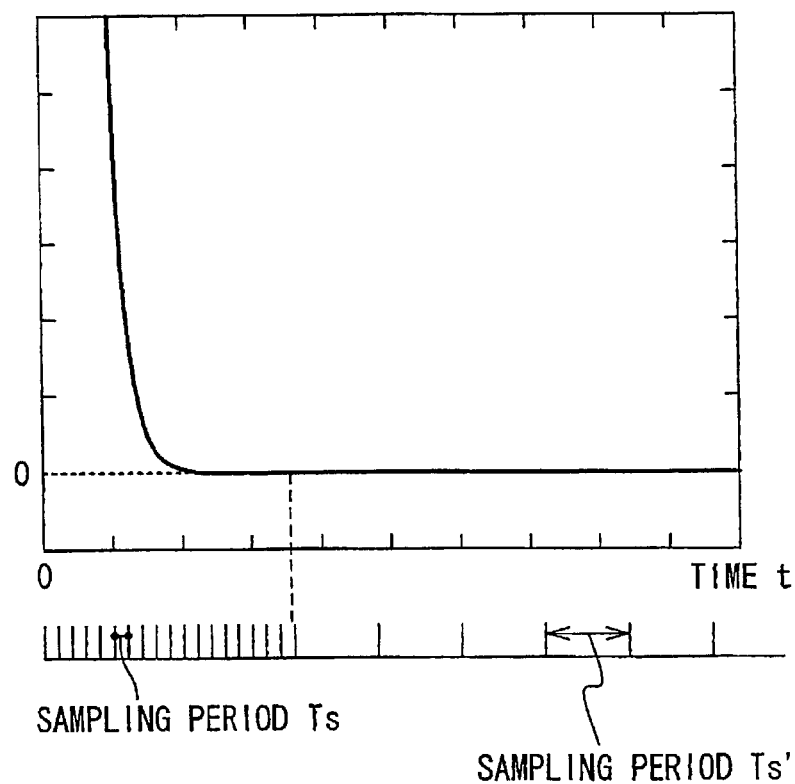
FIG. 25 is a graph showing sampling time in the MEMS mirror controlling method according to the present invention.
Figure 26:
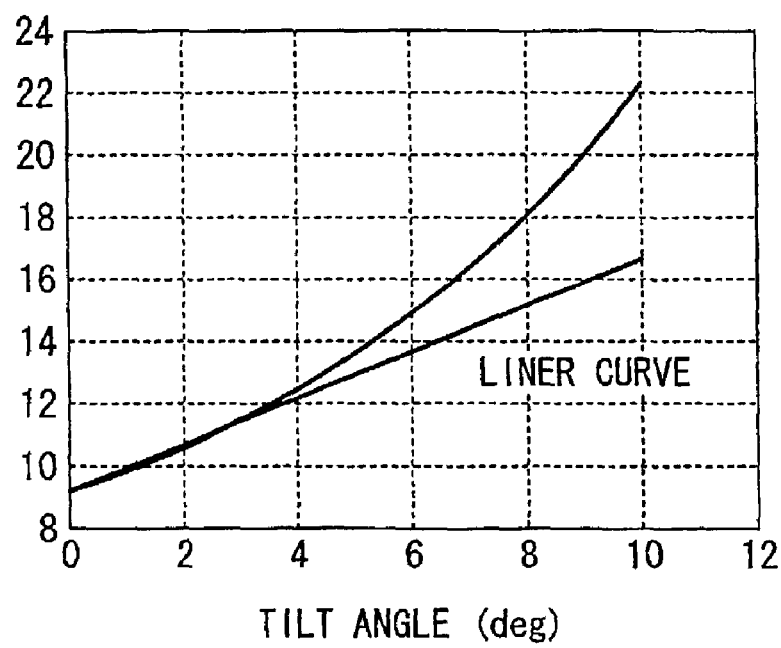
FIG. 26 is a graph showing the relation of an angle of a movable electrode and electrostatic force generated based on a drive voltage.
Figure 27:
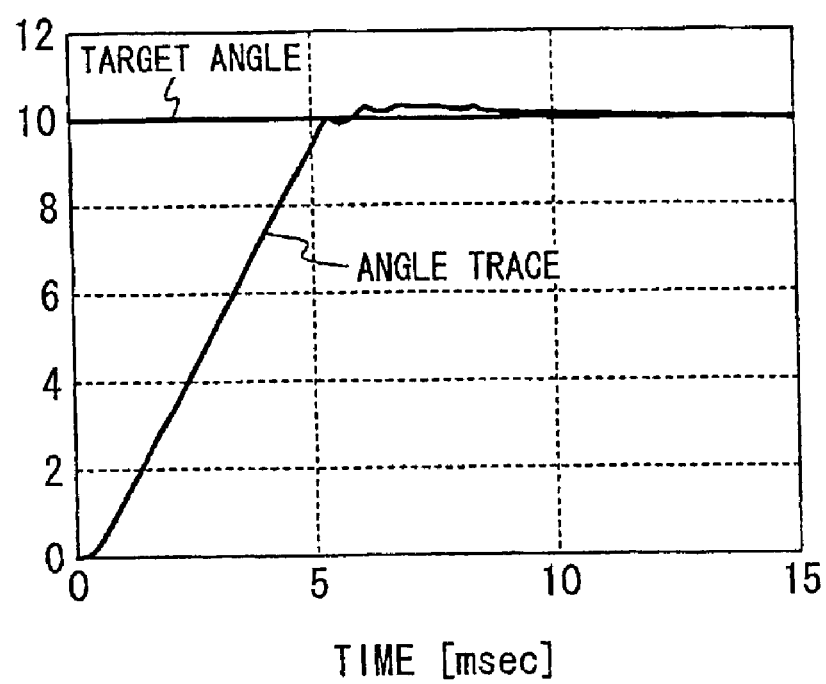
FIG. 27 is a graph showing the motion of the movable electrode when the movable electrode is moved to a larger angle using a linear control unit for feedback control.

FIG. 25 shows the change in the angular difference Δθ when the mirror mechanism 5 of the optical switch 1 is controlled and shows a sampling period as a loop period of the control. In the period during which the angular difference Δθ is converged to 0, the mirror mechanism 5 is controlled based on the predetermined sampling period Ts. When the angular difference Δθ is converged, the mirror mechanism 5 is controlled based on a sampling period Ts' different from the sampling period Ts. The sampling period Ts' is longer than periods Ts. Change of such sampling periods Ts and Ts' has the effect for reducing the load of the CPU when holds the angle.

Figure 28:
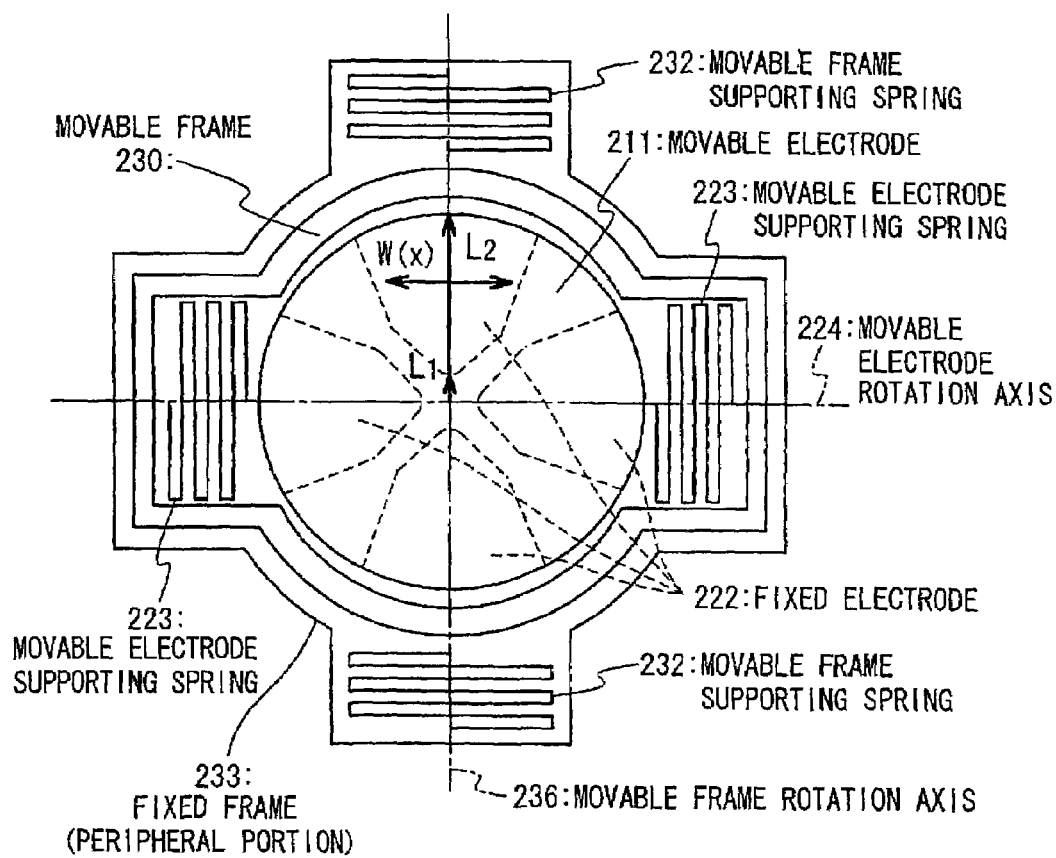
FIG. 28 is a plan view showing the mirror mechanism in the MEMS mirror system according to the sixth embodiment of the present invention.

FIG. 28 shows the mirror mechanism in the MEMS mirror system according to the sixth embodiment of the present invention. As shown in FIG. 28, a mirror mechanism 5b of 2 axes is composed of a movable electrode 221, a movable frame 230, a fixed frame 231, fixed electrodes 222-1, 222-2, 222-3, and 222-4, a movable electrode supporting spring 223, and a movable frame supporting spring 232. The movable electrode 221 is formed in the shape of a flat plate and has a flat mirror surface which reflects light. The movable electrode supporting spring 223 is formed of an elastic body and supports the movable electrode 221 at two edges. That is, the movable electrode supporting spring 223 supports the movable electrode 221 rotatably around the movable electrode rotation axis 224, and gives elastic force to the movable electrode 221 such that the movable electrode 221 can return to an original angular position. Also, the movable frame supporting spring 232 is formed of an elastic body and supports the movable frame 230 at two edges. That is, the movable frame supporting spring 232 supports the movable frame 230 rotatably around the movable frame rotation axis 226, and gives elastic force to the movable frame 230 such that the movable frame 230 can return to an original position. The movable electrode 221 and the movable frame 230 have the same potential as the potential of the fixed frame 231 through the movable electrode supporting spring 223 and the movable frame 232.

The fixed electrodes 222-1, 222-2, 222-3, and 222-4 are formed like a plate. When a drive voltage is applied to the fixed electrode 222-1 or 222-2, the movable electrode 221 is turned around the movable electrode rotation axis 224. Also, when a drive voltage is applied to the fixed electrodes 222-3 and 222-4, the movable frame section 230 is turned around the movable frame rotation axis 232.

Figure 29:
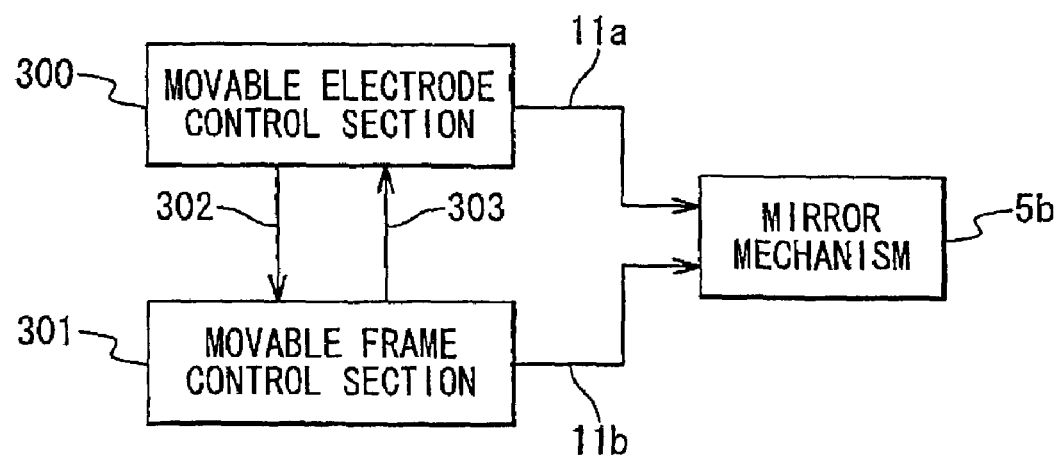
FIG. 29 is a block diagram showing the MEMS mirror system according to the sixth embodiment of the present invention.
Figure 31:
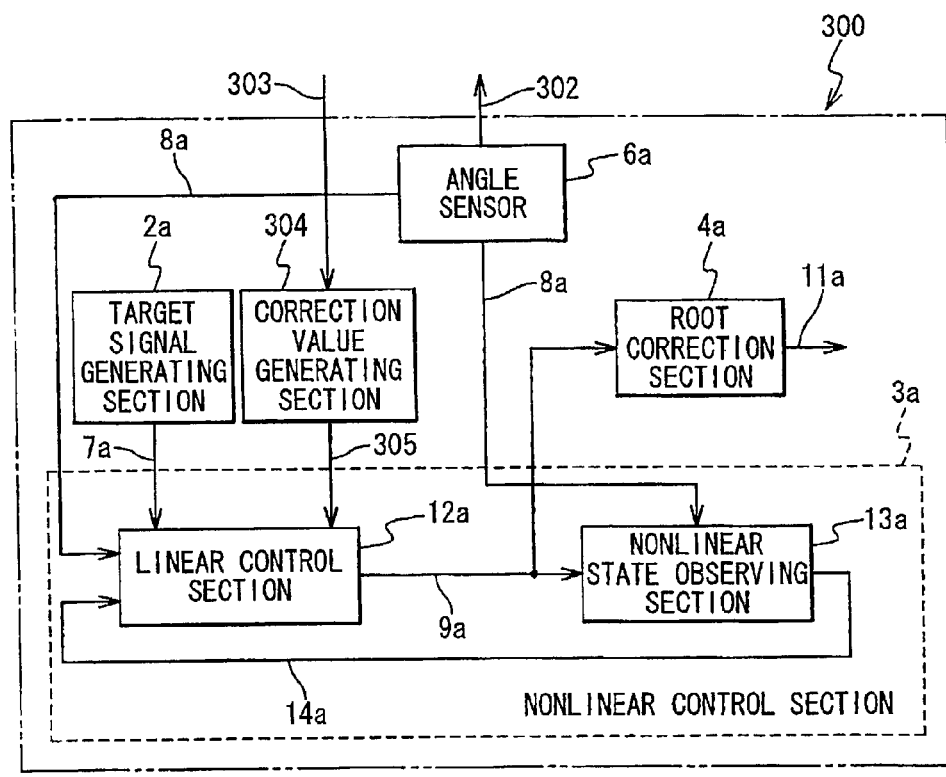
FIG. 31 is a block diagram showing the movable electrode control section 300 in the MEMS mirror system according to the sixth embodiment of the present invention.

FIG. 29 shows the light switch 1 to which the MEMS mirror system according to the sixth embodiment of the present invention is applied. The light switch 1 is composed of a movable electrode control section 300, a movable frame control section 301 and a mirror mechanism 5b, as shown in FIG. 29. FIG. 31 shows the movable electrode control section 300.

The movable electrode control section 300 is comprised of a target signal generating section 2a, a nonlinear control section 3a, a route correction section 4a, an angle sensor 6a, and a correction value generating section 304.

The target signal generating section 2a outputs a movable electrode target signal 7a to the nonlinear control section 3. The movable electrode target signal 7a shows an instruction value to rotate the movable electrode 221 around the movable electrode rotation axis 224.

The angle sensor 6a measures the movable electrode angle θm when the movable electrode section 21 of the mirror mechanism 5b is turned around the movable electrode rotation axis 224, and outputs the movable electrode angle signal 8a indicating the movable electrode angle θm to the nonlinear control section 3a and the movable electrode state signal 302 to the movable frame control section 301. The movable electrode state signal 302 is the movable electrode angle signal 8a or a signal generated based on the movable electrode angle signal 8a.

The correction value generating section 304 outputs a controller output correction signal 305 to the nonlinear control section 3a based on the movable frame state signal 303. The controller output correction signal 305 is a signal used to correct the controller output correction signal 9a for driving the movable electrode 221 based on the state of the movable frame 230.

The nonlinear control section 3a outputs the controller output signal 9a to the route correction section 4a based on the movable electrode target signals 7a, the movable electrode angle signal 8a and the controller correction signal 305.

The route correction section 4a outputs the drive voltage 11a to the mirror mechanism 5b based on the controller output signal 9a.

The mirror mechanism 5b changes the angular position of the movable electrode 221 in response to the drive voltage 11a.

Figure 32:
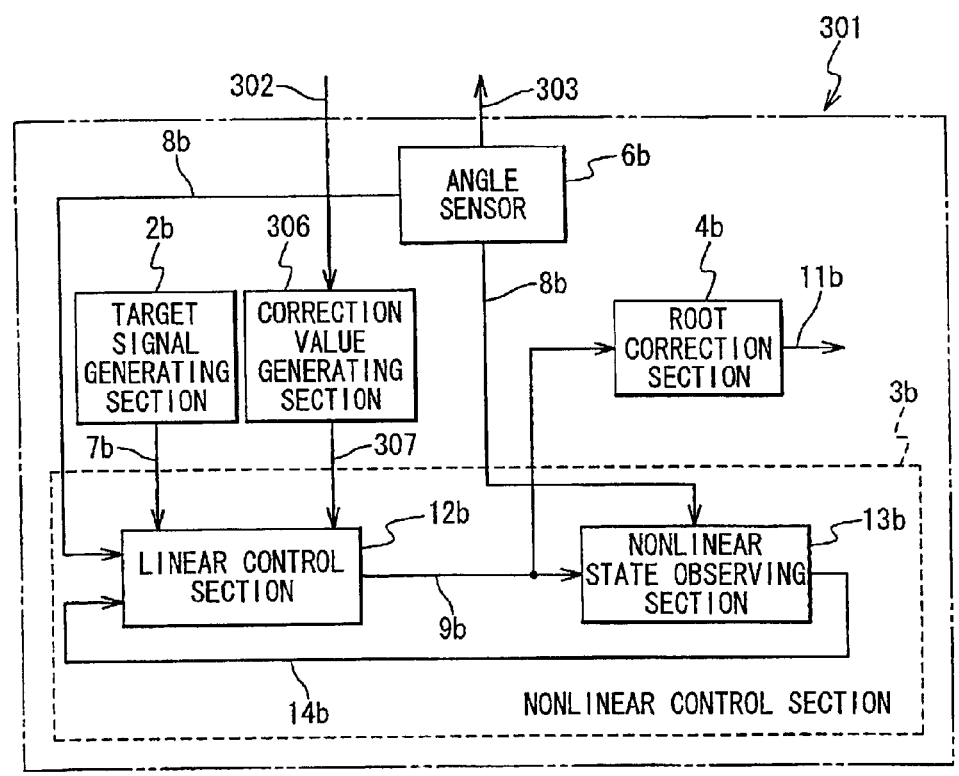
FIG. 32 is a block diagram showing the movable frame control section 301 in the MEMS mirror system according to the sixth embodiment of the present invention.

FIG. 32 shows the movable frame control section 301. Referring to FIG. 32, the movable frame control section 301 is composed of a target signal generating section 2b, a nonlinear control section 3b, a route correction section 4b, an angle sensor 6b and a root correction section 306.

The target signal generating section 2b outputs a movable frame target signal 7b to the nonlinear control section. The movable electrode target signal 7b indicates an instruction value to rotate the movable frame 230 around the movable frame rotation axis 232.

The angle sensor 6b measures the movable electrode angle θm when the movable electrode section 21 of the mirror mechanism 5b is turned around the movable electrode rotation axis 224, and outputs a movable electrode angle signal 8b indicating the movable electrode angle θm to the nonlinear control section 3b and the movable frame state signal 302 to the movable electrode control section 300. The movable frame state signal 303 is the movable electrode angle signal 8b or a signal generated based on the movable electrode angle signal 8b.

The root correction section 306 outputs the controller output correction signal 307 to the nonlinear control section 3b based on the movable electrode state signal 302. The controller output correction signal 307 indicates a signal used for correcting the controller output signal 9b for driving the movable frame 230 according to the state of the movable electrode 221.

The nonlinear control section 3b outputs a controller output signal 9b to the route correction section 4b based on the movable electrode target signal 7b, the movable electrode angle signal 8b and the controller correction signal 307.

The route correction section 4b outputs a drive voltage 11b to the mirror mechanism 5b based on the controller output signal 9b.

The mirror mechanism 5b change the angular position of the movable frame 230 in response to the drive voltage 11b.

Figure 30:
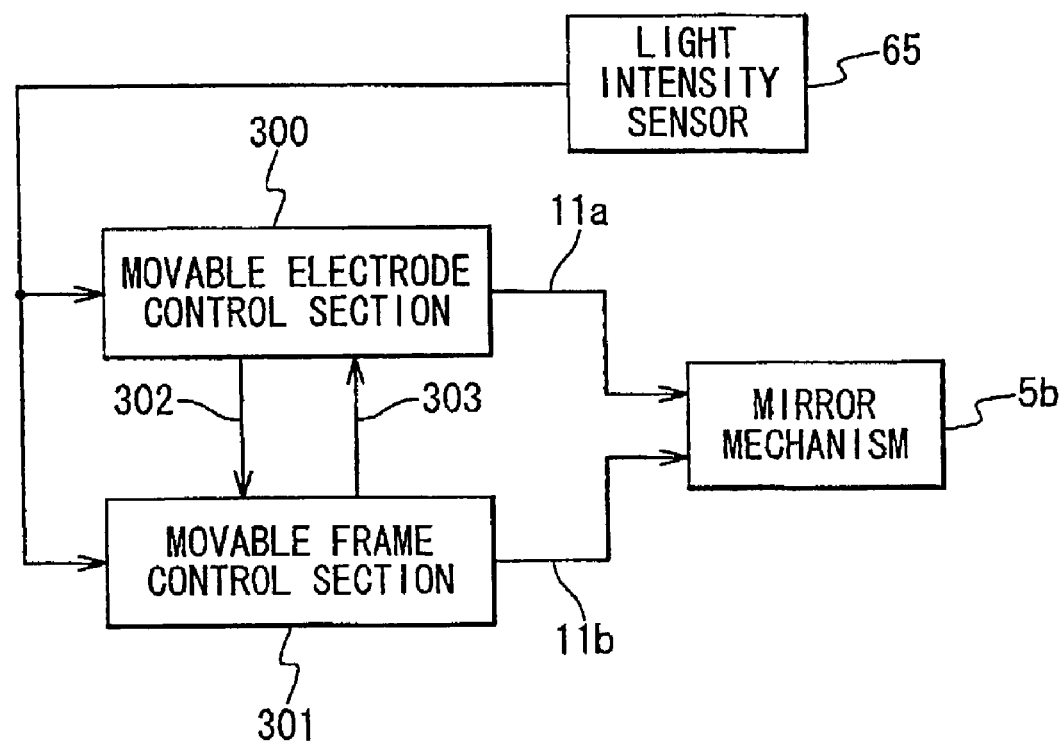
FIG. 30 is a block diagram showing the MEMS mirror system according to a seventh embodiment of the present invention.

FIG. 30 shows the MEMS mirror system according to the seventh embodiment of the present invention. In the seventh embodiment, a light intensity sensor 65 is added, as in the third embodiment. The light intensity sensor 65 generates and output the light intensity signal to the movable electrode control section 300 and the movable frame control section 301.

It should be noted that as another embodiment, the movable electrode state signal or the movable frame state signal are generated based on the angle signal or the signal generated from the angle signal. However, a signal calculated from the target signal, the controller output signal, the mirror state value estimation signal or a combination of them may be used.

The MEMS controlling mirror system according to the present invention can enlarge a controllable angular range of the mirror mechanism. For this reason, more optical transmission lines can be switched.

While the present invention has been described in connection with certain preferred embodiments, it is to be understood that the subject matter encompassed by way of the present invention is not to be limited to those specific embodiments. On the contrary, it is intended for the subject matter of the present invention to include all alternative, modification and equivalents as can be included within the spirit and scope of the following claims.

What is claimed is:

1. A micro movable mechanism system comprising:
   a micro movable mechanism;
   a target position generating section which generates a signal indicative a target position of said micro movable mechanism;
   a nonlinear control unit which outputs a controller output signal indicating a control value based on a difference between said target position signal and a signal indicating a current position of said micro movable mechanism; and
   a root correction section which drives said micro movable mechanism based on a signal proportional to a square root of said control value.

2. A micro movable mechanism system comprising:
   a mirror mechanism which has a mirror surface;
   a target position generating section which generates a signal indicating a target position θr of said mirror surface;
   a mirror angle deriving section which derives a current angle θ of said mirror surface;
   a nonlinear control unit which outputs a controller output signal indicating a control value u based on an angle difference Δθ between said current angle θ of said mirror surface and said target angle θr; and
   a root correction section which drives said mirror mechanism based on a signal of a drive voltage V proportional to a square root of said control value u such that said mirror surface is rotated.

3. The micro movable mechanism system according to claim 2, further comprising:
   a correction value generating section which corrects said control value u, and
   said root correction section drives said mirror mechanism based on the corrected control value such that said mirror surface is rotated.

4. The micro movable mechanism system according to claim 2, wherein said mirror mechanism comprises:
   a movable electrode section which has said mirror surface and rotates around a rotation axis;

a support spring section which supports said movable electrode section in a predetermined angle position with elastic force; and a fixed electrode section which is provided apart from said movable electrode section, and to which said drive voltage signal is applied from said root correction section, said drive voltage corresponding to a value proportional to the square root of said control value u, and said movable electrode section is rotated in the electrostatic force generated based on said drive voltage V applied by said fixed electrode section.

5. The micro movable mechanism system according to claim 4, wherein said mirror angle deriving section measures a direction of a light reflected by said mirror surface to derive said current angle θ.

6. The micro movable mechanism system according to claim 4, wherein said mirror angle deriving section comprises:

an angle sensor which measures a capacitance between said movable electrode section and said fixed electrode section and derives said current angle θ based on said capacitance.

7. The micro movable mechanism system according to claim 4, wherein said mirror angle deriving section comprises:

a nonlinear model section which derives said current angle θ using a mathematical model, said current angle θ from said predetermined angle position is a function in time t, and said nonlinear model section derives said current angle θ using a nonlinear gain f(θ) as a function of said current angle θ.

8. The micro movable mechanism system according to claim 7, wherein said fixed electrode section is provided apart from a projection line obtained by vertically projecting said rotation axis on a plane where said fixed electrode section exists, said nonlinear gain f(θ) is expressed by the following equation (3), using a distance D between said movable electrode section and said fixed electrode section, a distance L1 which is the shortest distance from said fixed electrode section to said projection line, a distance L2 (L2>L1>0) which is the longest distance from said fixed electrode section to said projection line, and a length W(x) in a direction parallel to said rotation axis:

$$f(\theta) = \int_{L_1}^{L_2} \frac{W(x)x}{\left\{\left(\frac{D}{\sin|\theta|} - x\right)\theta\right\}^2} dx \qquad (3)$$

said constant number B is expressed by the following equation (4) using a dielectric constant ε between said movable electrode section and said fixed electrode section:

$$B = \frac{1}{2}\varepsilon \qquad (4)$$

said constant number J is an inertia moment of said movable electrode section, said constant number C is a dumping of said support spring section, said constant number K is a stiffness of said support spring section, and said control value u is the following equation:

$$u=V^2.$$

9. The micro movable mechanism system according to claim 7, wherein said fixed electrode section has a rectangle, and is provided apart from a projection line when said rotation axis is vertically projected on a plane where said fixed electrode section exists, said nonlinear gain f(θ) is expressed by the following equation (5), using a distance D between said rotation axis to said fixed electrode section, a distance L1 from one side of said rectangle which is parallel to said rotation axis to said projection line, a distance L2 (L2>L1>0) from an opposite side to said side to said projection line, and a length W(x) in a direction parallel to said rotation axis:

$$f(\theta) = \frac{1}{\theta^2}\left[\left(\frac{\frac{D}{\sin|\theta|}}{\frac{D}{\sin|\theta|} - L_2} - \frac{\frac{D}{\sin|\theta|}}{\frac{D}{\sin|\theta|} - L_1}\right) + \left\{\log\left(\frac{D}{\sin|\theta|} - L_2\right) - \log\left(\frac{D}{\sin|\theta|} - L_1\right)\right\}\right] \qquad (5)$$

said constant number B is expressed by the following equation (6), using a length W of a side of said rectangle which is orthogonal to said rotation axis and a dielectric constant ε between said movable electrode section and said fixed electrode section:

$$B = \frac{1}{2}\varepsilon W \qquad (6)$$

said constant number J is an inertia moment of said movable electrode section, said constant number C is a dumping of said movable electrode section, said constant number K is a stiffness of said support spring section, and said control value u is the following equation:

$$u=V^2.$$

10. The micro movable mechanism system according to claim 7, wherein said nonlinear gain f(θ) is approximated as a polynomial of said current angle θ.

11. The micro movable mechanism system according to claim 2, wherein said mirror angle deriving section comprises:

a nonlinear model section which derives said current angle θ based on a mathematical model and said control value u.

12. The micro movable mechanism system according to claim 11, wherein said mathematical model is a motion equation of said movable electrode section.

13. The micro movable mechanism system according to claim 2, wherein said mirror angle deriving section comprises:

a nonlinear model section which derives said current angle θ based on a mathematical model and said drive voltage V.

14. The micro movable mechanism system according to claim 13, wherein said mathematical model is a motion equation of said movable electrode section.

15. The micro movable mechanism system according to claim 2, wherein said mirror angle deriving section comprises:
a nonlinear model section which derives said current angle θ using a mathematical model.

16. The micro movable mechanism system according to claim 15, wherein said current angle θ from said predetermined angle position of said movable electrode section is a function in time t, and
said nonlinear model section derives said current angle θ from the following equation (1), using a nonlinear gain f(θ) as a function of said current angle θ, constant number J, C, K, and B, and said control value u:

$$J\frac{d^2\theta}{dt^2} + C\frac{d\theta}{dt} + K\theta = Bf(\theta)u. \quad (1)$$

17. The micro movable mechanism system according to claim 15, wherein said current angle θ from said predetermined angle position is a function in time t, and
said nonlinear model section derives said current angle θ from the following equation (2), using a nonlinear gain f(θ) as a function of said current angle θ, constant number J, C, K, and B, said drive voltage V:

$$J\frac{d^2\theta}{dt^2} + C\frac{d\theta}{dt} + K\theta = Bf(\theta)V^2. \quad (2)$$

18. The micro movable mechanism system according to claim 2, wherein said nonlinear control unit comprises:
a nonlinear state observer section which derives an estimation ωo based on said control value u and said current angle θ; and
a linear control unit which derives a new control value u through a linear calculation of said estimation ωo and said current angle θ.

19. The micro movable mechanism system according to claim 2, wherein said nonlinear control unit comprises:
a nonlinear state observer section which derives an estimation ωo based on said control value u and said current angle θ: and
a linear control unit which derives a new control value u through PID control of said estimation ωo and said angle difference Δθ.

20. The micro movable mechanism system according to claim 2, wherein said nonlinear control unit comprises:
a nonlinear state observer section which derives an estimation ωo based on said control value u and said current angle θ such that a new control value u is derived based on said estimation ωo and said angle difference Δθ.

21. The micro movable mechanism system according to claim 20, wherein said nonlinear state observer section comprises:
a nonlinear gain section which derives a nonlinear gain f(θ) based on said current angle θ; and
a linear state observer section which derives a function of said current angle θ as said estimation ωo based on the following equation (7) using constant numbers J, C, K, and B:

$$J\frac{d^2\theta}{dt^2} + C\frac{d\theta}{dt} + K\theta = Bf(\theta)u. \quad (7)$$

22. The micro movable mechanism system according to claim 21, wherein said estimation ωo is angular speed dθ/dt.

23. The micro movable mechanism system according to claim 21, further comprising:
a calibration section which derives a correction value based on said current angle θ and said control value u, and
said linear state observer section updates said constant number J, C or K based on said correction value.

24. The micro movable mechanism system according to claim 23, wherein said nonlinear operation section updates said constant number L1, said constant number L2, said constant number D or said constant number W based on said correction value.

25. The micro movable mechanism system according to claim 23, wherein said nonlinear operation section updates said constant numbers of said polynomial approximation based on said correction value.

26. The micro movable mechanism system according to claim 20, further comprising:
a calibration section which derives a correction value based on said current angle θ and said control value u; and
a gain correction section which updates said control value u based on said correction value, and
said root correction section outputs to said mirror mechanism, said drive voltage signal indicating said drive voltage V proportional to a square root of the updated control value u.

27. The micro movable mechanism system according to claim 2, further comprising:
a light intensity sensor which measures a light intensity of a light beam which is reflected by said mirror surface and is received by a light receiving area; and
a light intensity angle conversion section which derives said angle difference Δθ based on said light intensity.

28. A micro movable mechanism system comprising:
a mirror mechanism which has a mirror surface rotatable around first and second rotation axes;
first and second units, each of which drives said mirror mechanism to rotate said mirror surface around a relating one of said first and second rotation axes, and
wherein each of said first and second unit comprises:
a target position generating section which generates a signal indicating a target position θr of said mirror surface for said relating rotation axis;
a mirror angle deriving section which derives a current angle θ of said mirror surface for said relating rotation axis;
a nonlinear control unit which outputs a controller output signal indicating a control value u for said relating rotation axis based on an angle difference θ between said current angle θ of said mirror surface and said target angle θr for said relating rotation axis; and
a root correction section which drives said mirror mechanism for said relating rotation axis based on a signal of a drive voltage V proportional to a square root of said control value u for said relating rotation axis such that said mirror surface is rotated.

29. The micro movable mechanism system according to claim 28, wherein each of said first and second units further comprises:
a correction value generating section, which corrects said control value u for said relating rotation axis, and
said root correction section drives said mirror mechanism based on the corrected control value u such that said mirror surface is rotated.

30. The micro movable mechanism system according to claim 28, wherein said mirror mechanism comprises:
a movable electrode section which has said mirror surface and is rotatable around for said first rotation axis;
a movable electrode support spring section which supports said movable electrode section in the predetermined angle position for said first rotation axis with elastic force;
a movable frame section which is connected to said movable electrode support spring section and is rotatable around for said second rotation axis which is not parallel to said first rotation axis;
a movable frame support spring section which supports said movable frame section in a predetermined angle position for said second rotation axis with elastic force;
a first fixed electrode section which is arranged in a plane parallel to said first rotation axis;
a second fixed electrode section which is arranged in a plane parallel to said second rotation axis; and
said movable electrode section and said movable frame section are rotated with electrostatic force generated based on said drive voltage signals which are applied to said first and second fixed electrode sections.

31. The micro movable mechanism system according to claim 30, wherein said mirror angle deriving section measures a direction of a light reflected by said mirror surface to derive said current angle $\theta$ for said relating rotation axis.

32. The micro movable mechanism system according to claim 30, wherein said mirror angle deriving section of said first unit comprises:
an angle sensor which measures a capacitance between said movable electrode section and said first fixed electrode section and derives said current angle $\theta$ based on said capacitance,
wherein said mirror angle deriving section of said second unit comprises:
an angle sensor which measures a capacitance between said movable frame section and said second fixed electrode section and derives said current angle $\theta$ based on said capacitance.

33. The micro movable mechanism system according to claim 30, wherein said mirror angle deriving section comprises:
a nonlinear model section which derives said current angle $\theta$ using a mathematical model.

34. The micro movable mechanism system according to claim 33, wherein said current angle $\theta$ from said predetermined angle position is a function in time t, and
said nonlinear model section derives said current angle $\theta$ from the following equation (1), using a nonlinear gain f($\theta$) as a function of said current angle $\theta$, constant number J, C, K, and B, and said control value u:

$$J\frac{d^2\theta}{dt^2} + C\frac{d\theta}{dt} + K\theta = Bf(\theta)u. \quad (1)$$

35. The micro movable mechanism system according to claim 33, wherein said current angle $\theta$ from said predetermined angle position is a function in time t, and
said nonlinear model section derives said current angle $\theta$ from the following equation (2), using a nonlinear gain f($\theta$) as a function of said current angle $\theta$, constant number J, C, K, and B, said drive voltage V:

$$J\frac{d^2\theta}{dt^2} + C\frac{d\theta}{dt} + K\theta = Bf(\theta)V^2. \quad (2)$$

36. The micro movable mechanism system according to claim 30, wherein said mirror angle deriving section comprises:
a nonlinear model section which derives said current angle $\theta$ using a mathematical model,
said current angle $\theta$ from said predetermined angle position is a function in time t, and
said nonlinear model section derives said current angle $\theta$ using a nonlinear gain f($\theta$) as a function of said current angle $\theta$.

37. The micro movable mechanism system according to claim 36, wherein said fixed electrode section is provided apart from a projection line obtained by vertically projecting said relating rotation axis on a plane where a corresponding one of said first and second fixed electrode section exists,
said nonlinear gain f($\theta$) is expressed by the following equation (3), using a distance D between said movable electrode section and said fixed electrode section, a distance L1 which is the shortest distance from said corresponding fixed electrode section to said projection line, a distance L2 (L2>L1>0) which is the longest distance from said corresponding fixed electrode section to said projection line, and a length W(x) in a direction parallel to said relating rotation axis:

$$f(\theta) = \int_{L_1}^{L_2} \frac{W(x)x}{\left\{\left(\frac{D}{\sin|\theta|} - x\right)\theta\right\}^2} dx \quad (3)$$

said constant number B is expressed by the following equation (4) using a dielectric constant $\epsilon$ between a corresponding one of said movable electrode section and said movable frame section and said corresponding fixed electrode section:

$$B = \frac{1}{2}\varepsilon \quad (4)$$

said constant number J is an inertia moment of said movable electrode section,
said constant number C is a dumping of said support spring section,
said constant number K is a stiffness of said support spring section, and
said control value u is the following equation:

$$u=V^2.$$

38. The micro movable mechanism system according to claim 36, wherein said fixed electrode section has a rectangle, and is provided apart from a projection line when said rotation axis is vertically projected on a plane where said fixed electrode section exists, said nonlinear gain f(θ) is expressed by the following equation (5), using a distance D between said rotation axis to said fixed electrode section, a distance L1 from one side of said rectangle which is parallel to said rotation axis to said projection line, a distance L2 (L2>L1>0) from an opposite side to said side to said projection line, and a length W(x) in a direction parallel to said rotation axis:

$$f(\theta) = \frac{1}{\theta^2}\left[\left(\frac{\frac{D}{\sin|\theta|}}{\frac{D}{\sin|\theta|} - L_2} - \frac{\frac{D}{\sin|\theta|}}{\frac{D}{\sin|\theta|} - L_1}\right) + \left\{\log\left(\frac{D}{\sin|\theta|} - L_2\right) - \log\left(\frac{D}{\sin|\theta|} - L_1\right)\right\}\right] \quad (5)$$

said constant number B is expressed by the following equation (6), using a length W of a side of said rectangle which is orthogonal to said rotation axis and a dielectric constant ε between a corresponding one of said movable electrode section and said movable frame section and said corresponding fixed electrode section:

$$B = \frac{1}{2}\varepsilon W \quad (6)$$

said constant number J is an inertia moment of said movable electrode section, said constant number C is a dumping of said movable electrode section, said constant number K is a stiffness of said support spring section, and said control value u is the following equation:

$$u = V^2.$$

39. The micro movable mechanism system according to claim 36, wherein said nonlinear gain f(θ) is approximated as a polynomial of said current angle θ.

40. The micro movable mechanism system according to claim 28, wherein said mirror angle deriving section comprises:

a nonlinear model section which derives said current angle θ based on a mathematical model and said control value u.

41. The micro movable mechanism system according to claim 40, wherein said mathematical model is a motion equation of said movable electrode section.

42. The micro movable mechanism system according to claim 28, wherein said mirror angle deriving section comprises:

a nonlinear model section which derives said current angle θ based on a mathematical model and said drive voltage V.

43. The micro movable mechanism system according to claim 42, wherein said mathematical model is a motion equation of said movable electrode section.

44. The micro movable mechanism system according to claim 28, wherein said nonlinear control unit comprises:

a nonlinear state observer section which derives an estimation ωo based on said control value u and said current angle θ; and a linear control unit which derives a new control value u through a linear calculation of said estimation ωo and said current angle θ.

45. The micro movable mechanism system according to claim 28, wherein said nonlinear control unit comprises:

a nonlinear state observer section which derives an estimation ωo based on said control value u and said current angle θ; and a linear control unit which derives a new control value u through PID control of said estimation ωo and said angle difference Δθ.

46. The micro movable mechanism system according to claim 28, wherein said nonlinear control unit comprises:

a nonlinear state observer section which derives an estimation ωo based on said control value u and said current angle θ such that a new control value u is derived based on said estimation ωo and said angle difference Δθ.

47. The micro movable mechanism system according to claim 46, wherein said nonlinear state observer section comprises:

a nonlinear gain section which derives a nonlinear gain f(θ) based on said current angle θ; and a linear state observer section which derives a function of said current angle θ as said estimation ωo based on the following equation (7) using constant numbers J, C, K, and B:

$$J\frac{d^2\theta}{dt^2} + C\frac{d\theta}{dt} + K\theta = Bf(\theta)u. \quad (7)$$

48. The micro movable mechanism system according to claim 47, wherein said estimation ωo is angular speed dθ/dt.

49. The micro movable mechanism system according to claim 47, wherein each of said first and second units further comprises:

a calibration section which derives a correction value based on said current angle θ and said control value u, and said linear state observer section updates said constant number J, C or K based on said correction value.

50. The micro movable mechanism system according to claim 49, wherein said nonlinear operation section updates said constant number L1, said constant number L2, said constant number D or said constant number W based on said correction value.

51. The micro movable mechanism system according to claim 49, wherein said nonlinear operation section updates said constant numbers of said polynomial approximation based on said correction value.

52. The micro movable mechanism system according to claim 46, each of said first and second units further comprises:

a calibration section which derives a correction value based on said current angle θ and said control value u; and a gain correction section which updates said control value u based on said correction value, and said root correction section outputs to said mirror mechanism, said drive voltage signal indicating said drive voltage V proportional to a square root of the updated control value u.

53. The micro movable mechanism system according to claim 28, each of said first and second units further comprises:

a light intensity sensor which measures a light intensity of a light beam which is reflected by said mirror surface and is received by a light receiving area; and a light intensity angle conversion section which derives said angle difference $\Delta\theta$ based on said light intensity.

* * * * *